United States Patent
Drinkard et al.

(10) Patent No.: US 9,532,011 B2
(45) Date of Patent: Dec. 27, 2016

(54) METHOD AND APPARATUS FOR PROJECTIVE VOLUME MONITORING

(75) Inventors: John Drinkard, Fremont, CA (US); Ambrish Tyagi, Palo Alto, CA (US); Yoshiharu Tani, Kasatsu (JP); Koichi Kinoshita, Ukyo-ku (JP)

(73) Assignee: Omron Corporation, Kyoto (JP)

( * ) Notice: Subject to any disclaimer, the term of this patent is extended or adjusted under 35 U.S.C. 154(b) by 1021 days.

(21) Appl. No.: 13/541,399

(22) Filed: Jul. 3, 2012

(65) Prior Publication Data
US 2013/0076866 A1    Mar. 28, 2013

Related U.S. Application Data

(60) Provisional application No. 61/504,608, filed on Jul. 5, 2011, provisional application No. 61/547,251, filed on Oct. 14, 2011.

(51) Int. Cl.
*H04N 7/18* (2006.01)
*G06T 7/00* (2006.01)

(52) U.S. Cl.
CPC ............ *H04N 7/181* (2013.01); *G06T 7/0077* (2013.01); *G06T 2207/10012* (2013.01); *G06T 2207/10021* (2013.01)

(58) Field of Classification Search
CPC .... H04N 13/0239; H04N 7/181; G06T 19/006
See application file for complete search history.

(56) References Cited

U.S. PATENT DOCUMENTS 5,625,408 A   4/1997  Matsugu et al.
6,177,958 B1  1/2001  Anderson
(Continued)

FOREIGN PATENT DOCUMENTS

EP  2275990 A1  1/2011
GB  2440826 A   2/2008
(Continued)

OTHER PUBLICATIONS

Schraml, S. et al. "Dynamic Stereo Vision Systems for Real-time Tracking." IEEE International Symposium on Circuits and Systems, Paris, France, pp. 1409-1412, May 30, 2010.
Kang, S.B. et al. "A Multibaseline Stereo System with Active illumination and Real-time Image Acquisition." Proceedings of the Fifth International Conference on Computer Vision, Jun. 20-23, 1995, pp. 88-93, Cambridge, MA, USA.
(Continued)

*Primary Examiner* — Zhubing Ren
(74) *Attorney, Agent, or Firm* — Murphy, Bilak & Homiller, PLLC

(57) ABSTRACT

According to one aspect of the teachings presented herein, a machine vision system includes one or more sensor units that are each advantageously configured to use different pairings among a set of spaced-apart image sensors, to provide redundant object detection for a primary monitoring zone, while simultaneously providing for the detection of objects that may shadow the primary monitoring zone. Further, a plurality of "mitigations" and enhancements provide safety-of-design and robust operation. Such mitigations and enhancements include, for example, bad-pixel detection and mapping, cluster-based pixel processing for improved object detection, test-image injection for fault detection, dual-channel, redundant processing for safety-critical object detection, temporal filtering to reduce false detections, and the use of high dynamic range (HDR) images, for improved operation over variable ambient lighting conditions.

25 Claims, 10 Drawing Sheets

(56) References Cited

U.S. PATENT DOCUMENTS

| | | |
|---|---|---|
| 6,829,371 B1 | 12/2004 | Nichani et al. |
| 8,933,593 B2 | 1/2015 | Haberer et al. |
| 2003/0095186 A1 | 5/2003 | Aman et al. |
| 2004/0045339 A1 | 3/2004 | Nichani et al. |
| 2004/0218784 A1 | 11/2004 | Nichani et al. |
| 2005/0093697 A1 | 5/2005 | Nichani et al. |
| 2005/0232487 A1 | 10/2005 | Fleisher |
| 2007/0296815 A1* | 12/2007 | Isaksson et al. ............... 348/157 |
| 2008/0043106 A1 | 2/2008 | Hassapis et al. |
| 2008/0273751 A1 | 11/2008 | Yuan et al. |
| 2010/0208104 A1 | 8/2010 | Imagawa et al. |
| 2011/0001799 A1 | 1/2011 | Rothenberger et al. |
| 2011/0211068 A1* | 9/2011 | Yokota ............................ 348/139 |
| 2012/0025989 A1 | 2/2012 | Cuddihy et al. |
| 2012/0051598 A1 | 3/2012 | Ikeda |
| 2012/0074296 A1 | 3/2012 | Hammes et al. |

FOREIGN PATENT DOCUMENTS

| | | |
|---|---|---|
| WO | 2006/014974 A1 | 2/2006 |
| WO | 2008061607 A1 | 5/2008 |

OTHER PUBLICATIONS

Mueller, M. et al. "Spatio-Temporal Consistent Depth Maps from Multi-View Video." 3DTV Conference: The True Vision—Capture, Transmission and Display of 3D Video, May 16-18, 2011, pp. 1-4, Antalya, Turkey.

Ober, A. et al. "A Safe Fault Tolerant Multi-View Approach for Vision-Based Protective Devices." Seventh IEEE International Conference on Advanced Video and Signal Based Surveillance, Aug. 29-Sep. 1, 2010, pp. 17-25, Boston, MA, USA.

Okutomi, M. et al. "A Multiple-Baseline Stereo." IEEE Transactions on Pattern Analysis and Machine Intelligence, Apr. 1993, pp. 353-363, vol. 15, Issue No. 4.

* cited by examiner

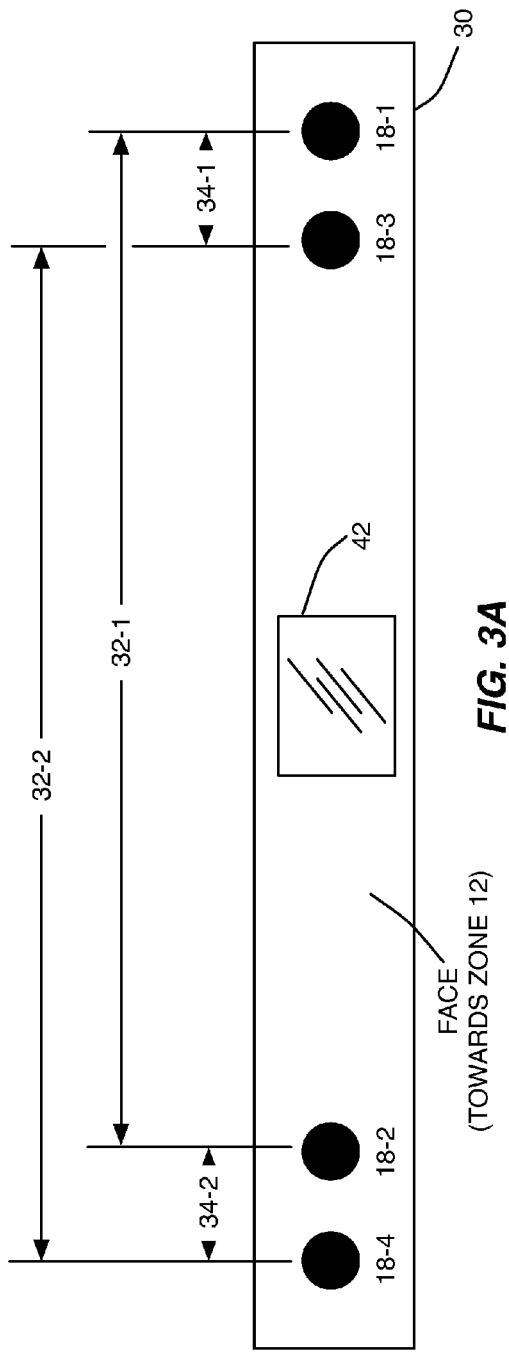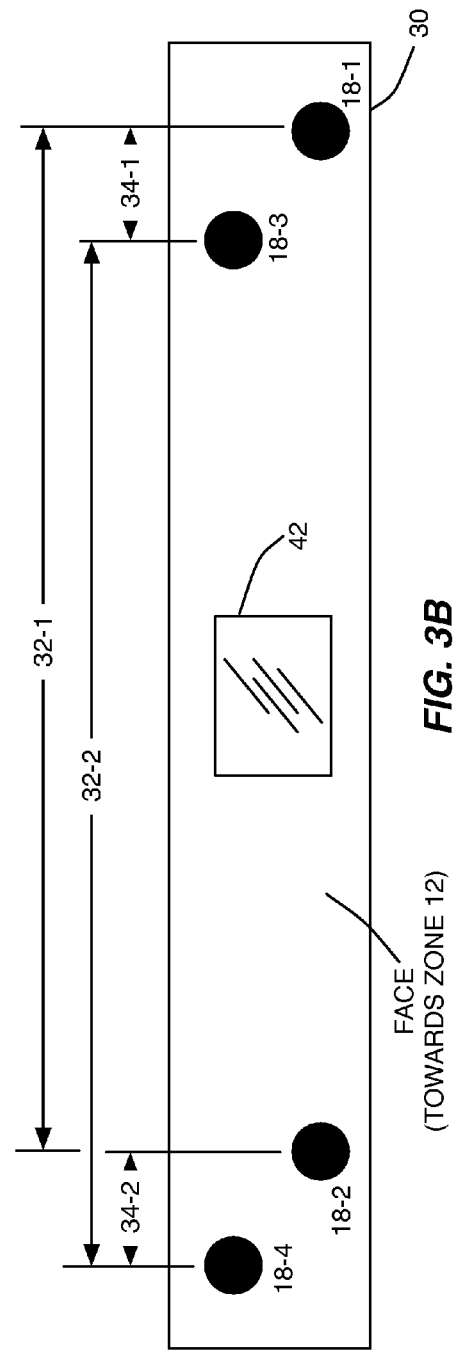

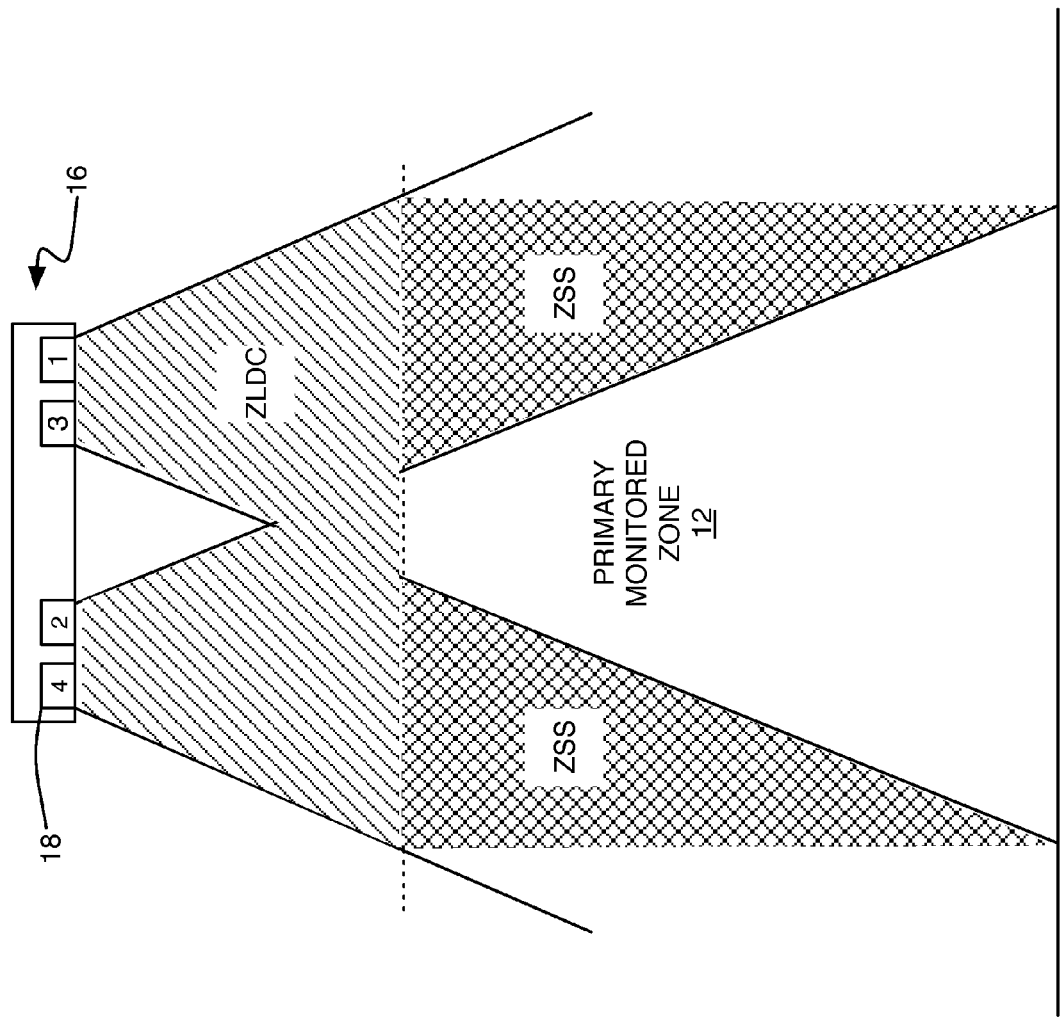

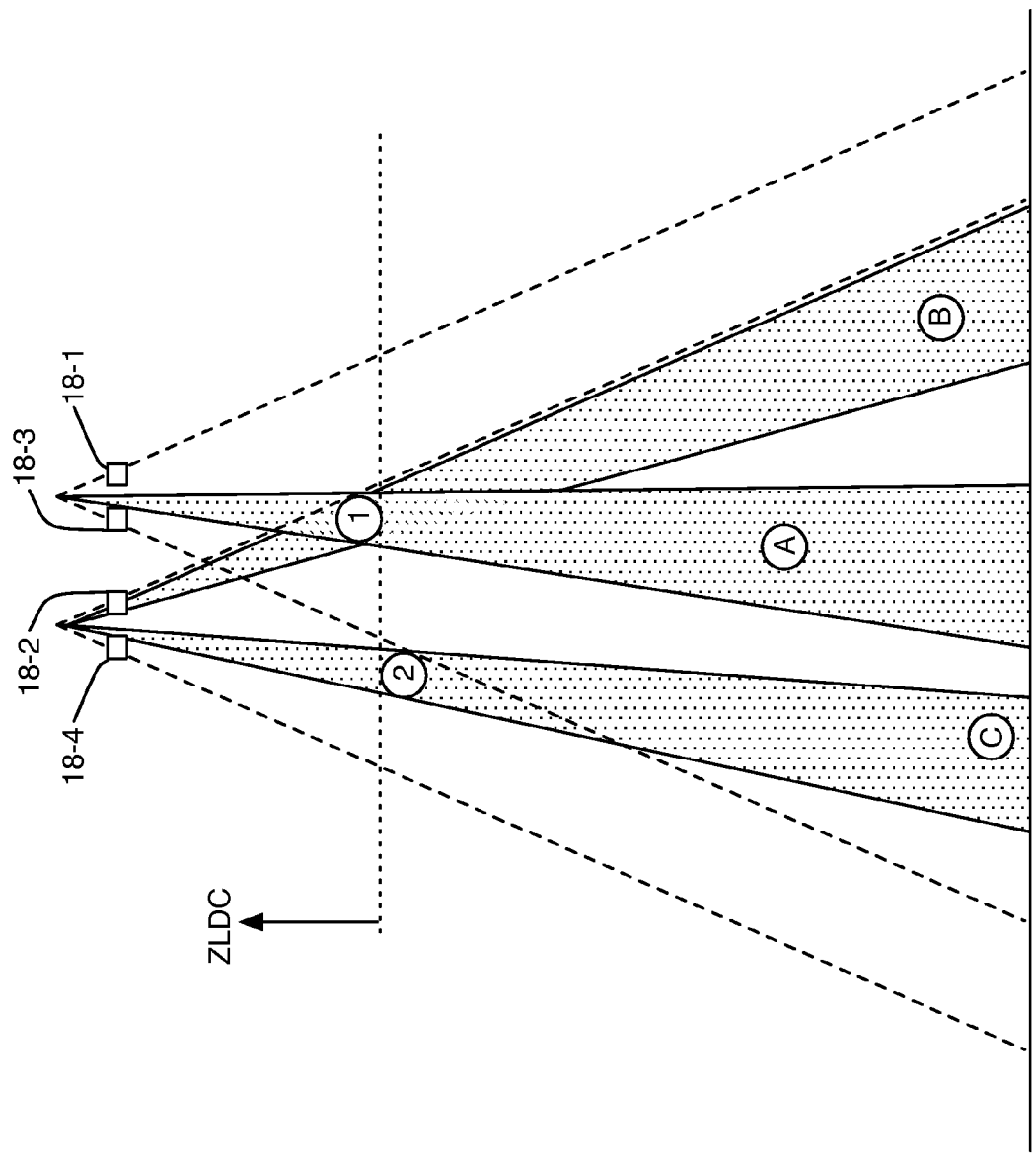

METHOD AND APPARATUS FOR PROJECTIVE VOLUME MONITORING

RELATED APPLICATIONS

This application claims priority under 35 U.S.C. §119(e) from the U.S. provisional application filed on 5 Jul. 2011 and assigned Application Ser. No. 61/504,608, and from the U.S. provisional application filed on 14 Oct. 2011 and assigned Application Ser. No. 61/547,251, both of which applications are incorporated herein by reference.

TECHNICAL FIELD

The present invention generally relates to machine vision and particularly relates to projective volume monitoring, such as used for machine guarding or other object intrusion detection contexts.

BACKGROUND

Machine vision systems find use in a variety of applications, with area monitoring representing a prime example. Monitoring for the intrusion of objects into a defined zone represents a key aspect of "area guarding" applications, such as hazardous machine guarding. In the context of machine guarding, various approaches are known, such as the use of physical barriers, interlock systems, safety mats, light curtains, and time-of-flight laser scanner monitoring.

While machine vision systems may be used as a complement to, or in conjunction with one or more of the above approaches to machine guarding, they also represent an arguably better and more flexible solution to area guarding. Among their several advantages, machine vision systems can monitor three-dimensional boundaries around machines with complex spatial movements, where planar light-curtain boundaries might be impractical or prohibitively complex to configure safely, or where such protective equipment would impede machine operation.

On the other hand, ensuring proper operation of a machine vision system is challenging, particularly in safety-critical applications with regard to dynamic, ongoing verification of minimum detection capabilities and maximum (object) detection response times. These kinds of verifications, along with ensuring failsafe fault detection, impose significant challenges when using machine vision systems for hazardous machine guarding and other safety critical applications.

SUMMARY

According to one aspect of the teachings presented herein, a machine vision system includes one or more sensor units that are each advantageously configured to use different pairings among a set of spaced-apart image sensors, to provide redundant object detection for a primary monitoring zone, while simultaneously providing for the detection of objects that may shadow the primary monitoring zone. Further, a plurality of "mitigations" and enhancements provide safety-of-design and robust operation. Such mitigations and enhancements include, for example, bad-pixel detection and mapping, cluster-based pixel processing for improved object detection, test-image injection for fault detection, dual-channel, redundant processing for safety-critical object detection, temporal filtering to reduce false detections, and the use of high dynamic range (HDR) images, for improved operation over variable ambient lighting conditions.

In an example configuration, a projective volume monitoring apparatus comprises a sensing unit that includes (at least) four image sensors, e.g., four cameras. The image sensors have respective sensor fields-of-view that commonly overlap a primary monitoring zone, and they are arranged so that first and second image sensors form a first primary-baseline pair whose spacing defines a first primary baseline, and third and fourth image sensors form a second primary-baseline pair whose spacing defines a second primary baseline. The image sensors are further arranged so that the first and third image sensors form a first secondary-baseline pair whose spacing defines a first secondary baseline, and the second and fourth imaging sensors form a second secondary-baseline pair whose spacing defines a second secondary baseline. The primary baselines are longer than the secondary baselines.

The sensor unit further includes image-processing circuits that are configured to redundantly detect objects within the primary monitoring zone using image data acquired from the primary-baseline pairs, e.g., each primary baseline pair of image sensors feeds stereoscopic images into a stereo processing channel that determines 3D range data from the stereoscopic image pairs. The image-processing circuits are also configured to detect shadowing objects using image data acquired from the secondary-baseline pairs. An object is a "shadowing object" if it obstructs one or more of the sensor fields-of-view with respect to the primary monitoring zone.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 3A-3C are block diagrams of example geometric arrangements for establishing primary- and secondary-baseline pairs among a set of four image sensors in a sensor unit.

FIGS. 7A and 7B are diagrams illustrating a Zone of Limited Detection (ZLDC) that is inside a minimum detection distance specified for a projective volume monitoring, and further illustrating a Zone of Side Shadowing (ZSS) on either side of a primary monitoring zone.

DETAILED DESCRIPTION

Figure 1:
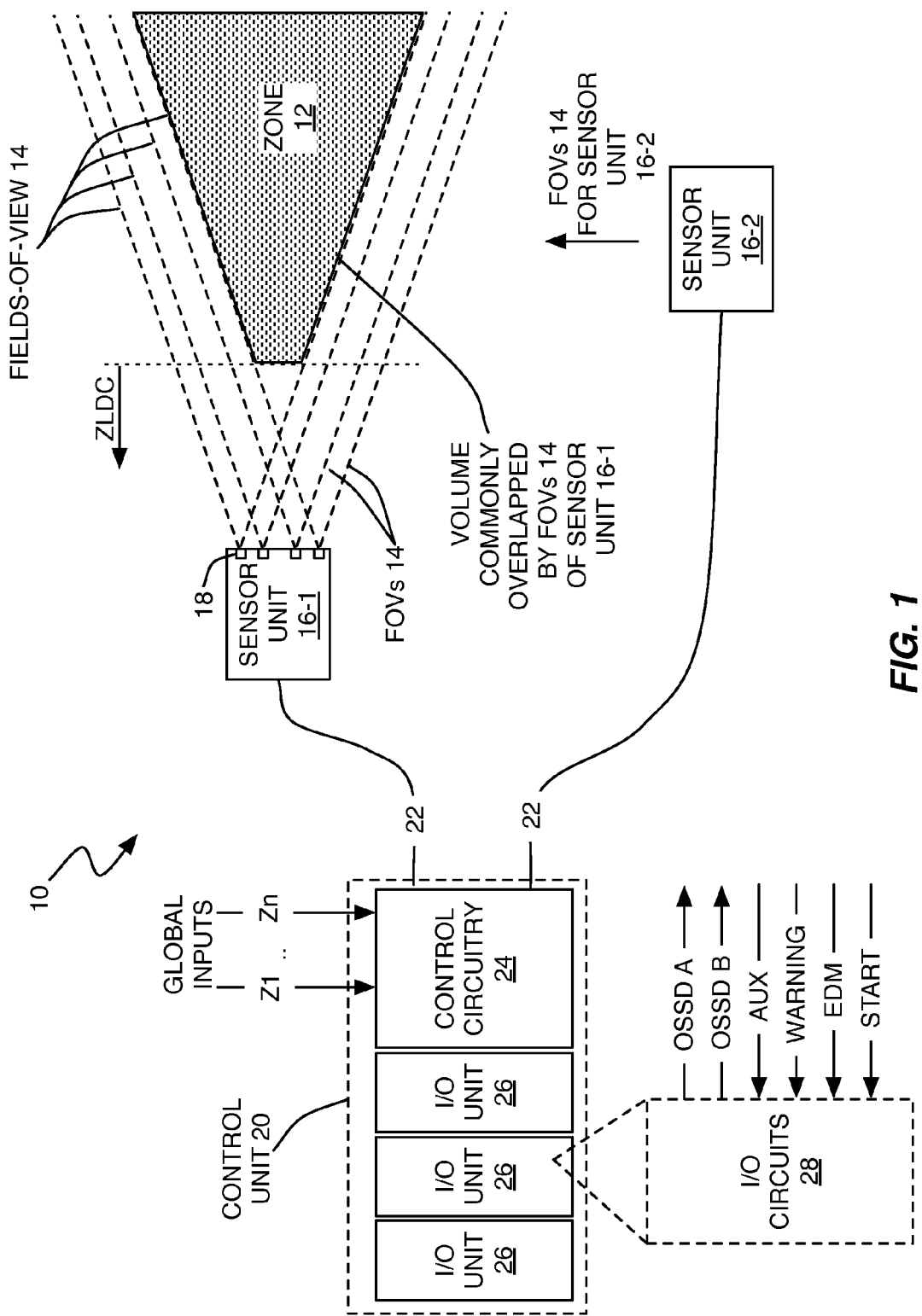
FIG. 1 is a block diagram of one embodiment of a projective volume monitoring apparatus that includes a control unit and one or more sensor units.

FIG. 1 illustrates an example embodiment of a projective volume monitoring apparatus 10, which provides image-based monitoring of a primary monitoring zone 12 that comprises a three-dimensional spatial volume containing, for example, one or more items of hazardous machinery (not shown in the illustration). The projective volume monitoring apparatus 10 (hereafter, "apparatus 10") operates as an image-based monitoring system, e.g., for safeguarding against the intrusion of people or other objects into the primary monitoring zone 12.

Note that the limits of the zone 12 are defined by the common overlap of associated sensor fields-of-view 14, which are explained in more detail later. Broadly, the apparatus 10 is configured to use image processing and stereo vision techniques to detect the intrusion of persons or objects into a guarded three-dimensional (3D) zone, which may also be referred to as a guarded "area." Typical applications include, without limitation, area monitoring and perimeter guarding. In an area-monitoring example, a frequently accessed area is partially bounded by hard guards with an entry point that is guarded by a light curtain or other mechanism, and the apparatus 10 acts as a secondary guard system. Similarly, in a perimeter-guarding example, the apparatus 10 monitors an infrequently accessed and unguarded area.

Of course, the apparatus 10 may fulfill both roles simultaneously, or switch between modes with changing contexts. Also, it will be understood that the apparatus 10 may include signaling connections to the involved machinery or their power systems and/or may have connections to factory-control networks, etc.

To complement a wide range of intended uses, the apparatus 10 includes, in the illustrated example embodiment, one or more sensor units 16. Each sensor unit 16, also referred to as a "sensor head," includes a plurality of image sensors 18. The image sensors 18 are fixed within a body or housing of the sensor unit 16, such that all of the fields-of-view (FOV) 14 commonly overlap to define the primary monitoring zone 12 as a 3D region. Of course, as will be explained later, the apparatus 10 in one or more embodiments permits a user to configure monitoring multiple zones or 3D boundaries within the primary monitoring zone 12, e.g., to configure safety-critical and/or warning zones based on 3D ranges within the primary monitoring zone 12.

Each one of the sensor units 16 connects to a control unit 20 via a cable or other link 22. In one embodiment, the link(s) 22 are "PoE" (Power-over-Ethernet) links that supply electric power to the sensor units 16 and provide for communication or other signaling between the sensor units 16 and the control unit 20. The sensor units 16 and the control unit 20 operate together for sensing objects in the zone 12 (or within some configured sub-region of the zone 12). In at least one embodiment, each sensor unit 16 performs its monitoring functions independently from the other sensor units 16 and communicates its monitoring status to the control unit 20 over a safe Ethernet connection, or other link 22. In turn, the control unit 20 processes the monitoring status from each connected sensor unit 16 and uses this information to control machinery according to configurable safety inputs and outputs.

For example, in the illustrated embodiment, the control unit 20 includes control circuitry 24, e.g., one or more microprocessors, DSPs, ASICs, FPGAs, or other digital processing circuitry. In at least one embodiment, the control circuitry 24 includes memory or another computer-readable medium that stores a computer program, the execution of which by a digital processor in the control circuit 24, at least in part, configures the control unit 20 according to the teachings herein.

The control unit 20 further includes certain Input/Output (I/O) circuitry, which may be arranged in modular fashion, e.g., in a modular I/O unit 26. The I/O units 26 may comprise like circuitry, or given I/O units 26 may be intended for given types of interface signals, e.g., one for network communications, one for certain types of control signaling, etc. For machine-guarding applications, at least one of the I/O units 26 is configured for machine-safety control and includes I/O circuits 28 that provide safety-relay outputs (OSSD A, OSSD B) for disabling or otherwise stopping a hazardous machine responsive to object intrusions detected by the sensor unit(s) 16. The same circuitry also may provide for mode-control and activation signals (START, AUX, etc.). Further, the control unit itself may offer a range of "global" I/O, for communications, status signaling, etc.

Figure 2:
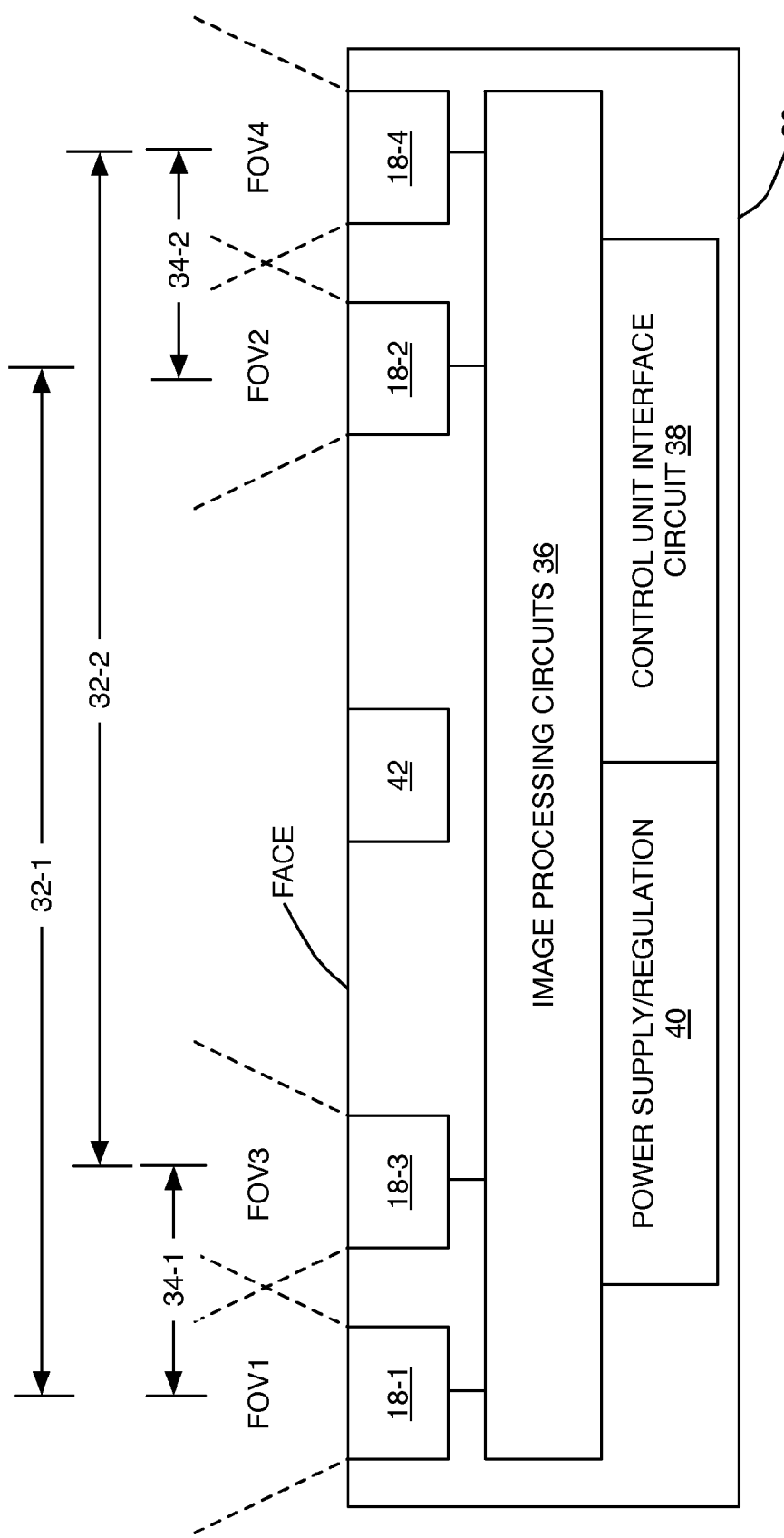
FIG. 2 is a block diagram of one embodiment of a sensor unit.

In terms of its object detection functionality, the apparatus 10 relies primarily on stereoscopic techniques to find the 3D position of objects present in its (common) field-of-view. To this end, FIG. 2 illustrates an example sensor unit 16 that includes four image sensors 18, individually numbered here for clarity of reference as image sensors 18-1, 18-2, 18-3, and 18-4. The fields-of-view 14 of the individual image sensors 18 within a sensor unit 16 are all partially overlapping and the region commonly overlapped by all fields-of-view 14 defines the earlier-introduced primary monitoring zone 12.

A body or housing 30 fixes the individual image sensors 18 in a spaced apart arrangement that defines multiple "baselines." Here, the term "baseline" defines the separation distance between a pairing of image sensors 18 used to acquire image pairs. In the illustrated arrangement, one sees two "long" baselines and two "short" baselines—here, the terms "long" and "short" are used in a relative sense. The long baselines include a first primary baseline 32-1 defined by the separation distance between a first pair of the image sensors 18, where that first pair includes the image sensors 18-1 and 18-2, and further include a second primary baseline 32-2 defined by the separation distance between a second pair of the image sensors 18, where that second pair includes the image sensors 18-3 and 18-4.

Similarly, the short baselines include a first secondary baseline 34-1 defined by the separation distance between a third pair of the image sensors 18, where that third pair includes the image sensors 18-1 and 18-3, and further include a second secondary baseline 34-2 defined by the separation distance between a fourth pair of the image sensors 18, where that fourth pair includes the image sensors 18-2 and 18-4. In this regard, it will be understood that different combinations of the same set of four image sensors 18 are operated as different pairings of image sensors 18, wherein those pairings may differ in terms of their associated baselines and/or how they are used.

Figure 3C:
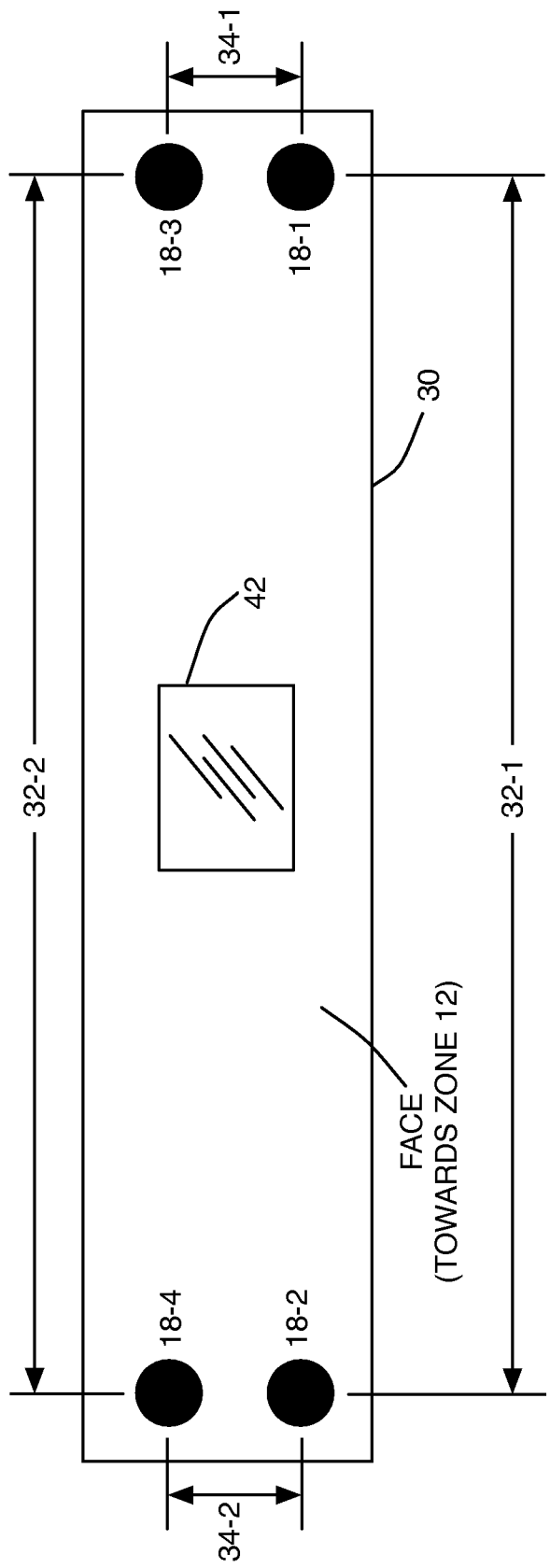

The first and second primary baselines 32-1 and 32-2 may be co-equal, or may be different lengths. Likewise, the first and second secondary baselines 34-1 and 34-2 may be co-equal, or may be different lengths. While not limiting, in an example case, the shortest primary baseline 32 is more than twice as long as the longest secondary baseline 34. As another point of flexibility, other geometric arrangements can be used to obtain a distribution of the four image sensors 18, for operation as primary and secondary baseline pairs. See FIGS. 3A-3C, illustrating example geometric arrangements of image sensors 18 in a given sensor unit 16.

Apart from the physical arrangement needed to establish the primary and secondary baseline pairs, it should be understood that the sensor unit 16 is itself configured to logically operate the image sensors 18 in accordance with the baseline pairing definitions, so that it processes the image pairs in accordance with those definitions. In this regard, and with reference again to example shown in FIG.

2, the sensor unit 16 includes one or more image-processing circuits 36, which are configured to acquire image data from respective ones of the image sensors 18, process the image data, and respond to the results of such processing, e.g., notifying the control unit 20 of detected object intrusions, etc.

The sensor unit 16 further includes control unit interface circuits 38, a power supply/regulation circuit 40, and, optionally, a textured light source 42. Here, the textured light source 42 provides a mechanism for the sensor unit 16 to project patterned light into the primary monitoring zone 12, or more generally into the fields-of-view 14 of its included image sensors 18.

The term "texture" as used here refers to local variations in image contrast within the field-of-view of any given image sensor 18. The textured light source 42 may be integrated within each sensor unit 16, or may be separately powered and located in close proximity with the sensor units 16. In either case, incorporating a source of artificial texture into the apparatus 10 offers the advantage of adding synthetic texture to low-texture regions in the field-of-view 14 of any given image sensor 18. That is, regions without sufficient natural texture to support 3D ranging can be illuminated with synthetically added scene texture provided by the texture light source 42, for accurate and complete 3D ranging within the sensor field-of-view 14.

The image-processing circuits 36 comprise, for example, one or more microprocessors, DSPs, FPGAs, ASICs, or other digital processing circuitry. In at least one embodiment, the image-processing circuits 36 include memory or another computer-readable medium that stores computer program instructions, the execution of which at least partially configures the sensor unit 16 to perform the image processing and other operations disclosed herein. Of course, other arrangements are contemplated, such as where certain portions of the image processing and 3D analysis are performed in hardware (e.g., FPGAs) and certain other portions are performed in one or more microprocessors.

With the above baseline arrangements in mind, the apparatus 10 can be understood as comprising at least one sensing unit 16 that includes (at least) four image sensors 18 having respective sensor fields-of-view 14 that all overlap a primary monitoring zone 12 and arranged so that first and second image sensors 18-1 and 18-2 form a first primary-baseline pair whose spacing defines a first primary baseline 32-1, third and fourth image sensors 18-3 and 18-4 form a second primary-baseline pair whose spacing defines a second primary baseline 32-2.

As shown, the image sensors 18 are further arranged so that the first and third image sensors 18-1 and 18-3 form a first secondary-baseline pair whose spacing defines a first secondary baseline 34-1, and the second and fourth imaging sensors 18-2 and 18-4 form a second secondary-baseline pair whose spacing defines a second secondary baseline 34-2. The primary baselines 32 are longer than the secondary baselines 34.

The sensor unit 16 further includes image-processing circuits 36 configured to redundantly detect objects within the primary monitoring zone 12 using image data acquired from the primary-baseline pairs, and further configured to detect shadowing objects using image data acquired from the secondary-baseline pairs. That is, the image-processing circuits 36 of the sensor unit 16 are configured to redundantly detect objects within the primary monitoring zone 12 by detecting the presence of such objects in range data derived via stereoscopic image processing of the image data acquired by the first primary-baseline pair, or in range data derived via stereoscopic image processing of the image data acquired by the second primary-baseline pair.

Thus, objects will be detected if they are discerned from the (3D) range data obtained from stereoscopically processing image pairs obtained from the image sensors 18-1 and 18-2 and/or if such objects are discerned from the (3D) range data obtained from stereoscopically processing image pairs obtained from the image sensors 18-3 and 18-4. In that regard, the first and second image sensors 18-1 and 18-2 may be regarded as a first "stereo pair," and the image correction and stereoscopic processing applied to the image pairs acquired from the first and second image sensors 18-1 and 18-2 may be regarded as a first stereo "channel."

Likewise, the third and fourth image sensors 18-3 and 18-4 are regarded as a second stereo pair, and the image processing and stereoscopic processing applied to the image pairs acquired from the third and fourth image sensors 18-3 and 18-4 may be regarded as a second stereo channel, which is independent from the first stereo channel. Hence, the two stereo channels provide redundant object detection within the primary monitoring zone 12.

Here, it may be noted that the primary monitoring zone 12 is bounded by a minimum detection distance representing a minimum range from the sensor unit 16 at which the sensor unit 16 detects objects using the primary-baseline pairs. As a further advantage, in addition to the reliability and safety of using redundant object detection via the primary-baseline pairs, the secondary baseline pairs are used to detect shadowing objects. That is, the logical pairing and processing of image data from the image sensors 18-1 and 18-3 as the first secondary-baseline pair, and from the image sensors 18-2 and 18-4 as the second secondary-baseline pair, are used to detect objects that are within the minimum detection distance and/or not within all four sensor fields-of-view 14.

Broadly, a "shadowing object" obstructs one or more of the sensor fields-of-view 14 with respect to the primary monitoring zone 12. In at least one embodiment, the image-processing circuits 36 of the sensor unit 16 are configured to detect shadowing objects by, for each secondary-baseline pair, detecting intensity differences between the image data acquired by the image sensors 18 in the secondary-baseline pair, or by evaluating range data generated from stereoscopic image processing of the image data acquired by the image sensors 18 in the secondary-baseline pair.

Shadowing object detection addresses a number of potentially hazardous conditions, including these items: manual interference, where small objects in the ZLDC or ZSS will not be detected by stereovision and can shadow objects into the primary monitoring zone 12; spot pollution, where pollution on optical surfaces is not detected by stereovision and can shadow objects primary monitoring zone 12; ghosting, where intense directional lights can result in multiple internal reflections on an image sensor 18, which degrades contrast and may result in a deterioration of detection capability; glare, where the optical surfaces of an image sensor 18 have slight contamination, directional lights can result in glare, which degrades contrast and may result in a deterioration of detection capability; and sensitivity changes, where changes in the individual pixel sensitivities in an image sensor 18 may result in a deterioration of detection capability.

Figure 8:
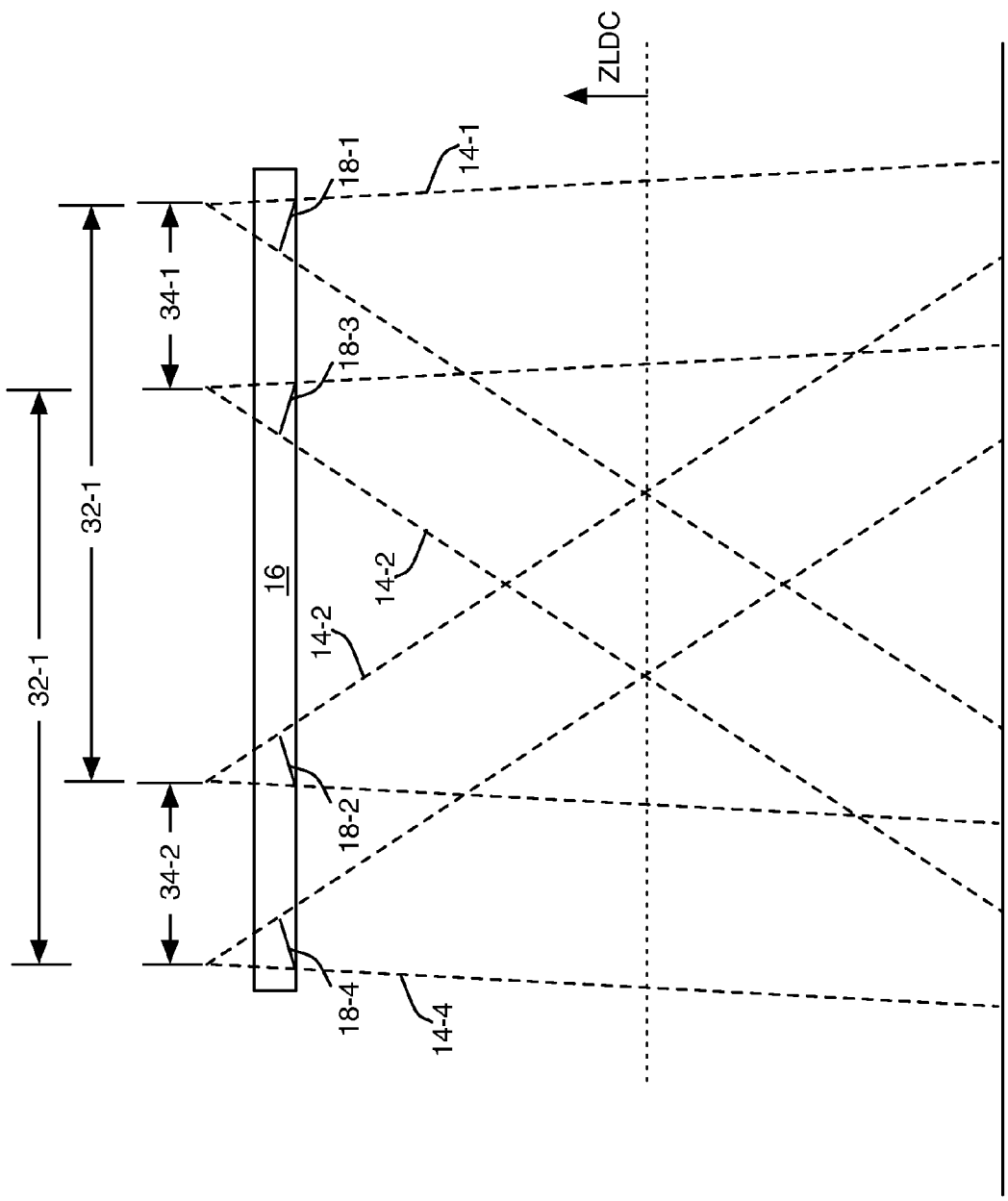
FIG. 8 is a diagram of an example configuration for a sensor unit, including its image sensors and their respective fields-of-view.

Referring momentarily to FIG. 8, the existence of verging angles between the left and right side image sensors 18 in a primary-baseline pair impose a final configuration such as the one depicted. These verging angles provide a basis for shadowing object detection, wherein, in an example configuration, the image processing circuits 36 perform shadowing object detection within the ZLDC, based on looking for significant differences in intensity between the images acquired from one image sensor 18 in a given secondary-baseline pair, as compared to corresponding images acquired from the other image sensor 18 in that same secondary-baseline pair. Significant intensity differences signal the presence of close-by objects, because, for such a small baseline, more distant objects will cause very small disparities.

The basic image intensity difference is calculated by analyzing each pixel on one of the images (Image1) in the relevant pair of images, and searching over a given search window for an intensity match, within some threshold (th), on the other image (Image2). If there is no match, it means that the pixel belongs to something closer than a certain range because its disparity is greater than the search window size and the pixel is flagged as 'different'. The image difference is therefore binary.

Because image differences due to a shadowing object are based on the disparity introduced in image pairs acquired using one of the secondary baselines 34-1 or 34-2, if an object were to align with the baseline and go through-and-through the protected zone it would result in no differences found. An additional through-and-through object detection algorithm that is based in quasi-horizontal line detection is also used, to detect objects within those angles not reliably detected by the basic image difference algorithm, e.g., +/−fifteen degrees.

Further, if a shadowing object is big and/or very close (for example if it covers the whole field-of-view 14 of an image sensor 18) it may not even provide a detectable horizontal line. However, this situation is detected using reference marker-based mitigations, because apparatus configuration requirements in one or more embodiments require that at least one reference marker must be visible within the primary monitoring zone 12 during a setup/verification phase.

As for detecting objects that are beyond the ZLDC but outside the primary monitoring zone 12, the verging angles of the image sensors 18 may be configured so as to essentially eliminate the ZSSs on either side of the primary monitoring zone 12. Additionally, or alternatively, the image processing circuits 36 use a short-range stereovision approach to object detection, wherein the secondary-baseline pairs are used to detect objects over a very limited portion of the field of view, only at the appropriate image borders.

Also, as previously noted, in some embodiments, the image sensors 18 in each sensor unit 16 are configured to acquire image frames, including high-exposure image frames and low-exposure image frames. For example, the image-processing circuits 36 are configured to dynamically control the exposure times of the individual image sensors 18, so that image acquisition varies between the use of longer and shorter exposure times. Further, the image-processing circuits 36 are configured, at least with respect to the image frames acquired by the primary baseline pairs, to fuse corresponding high- and low-exposure image frames to obtain high dynamic range (HDR) images, and to stereoscopically process streams of said HDR images from each of the primary-baseline pairs, for redundant detection of objects in the primary monitoring zone.

For example, the image sensor 18-1 is controlled to generate a low-exposure image frame and a subsequent high-exposure image frame, and those two frames are combined to obtain a first HDR image. In general, two or more different exposure frames can be combined to generate HDR images. This process repeats over successive acquisition intervals, thus resulting in a stream of first HDR images. During the same acquisition intervals, the image sensor 18-2 is controlled to generate low- and high-exposure image frames, which are combined to make a stream of second HDR images. The first and second HDR images from any given acquisition interval form a corresponding HDR image pair, which are stereoscopically processed (possibly after further pre-processing in advance of stereoscopic processing). A similar stream of HDR image pairs in the other stereo channel are obtained via the second primary-baseline pair (i.e., image sensors 18-3 and 18-4).

Additional image pre-processing may be done, as well. For example, in some embodiments, the HDR image pairs from each stereo channel are rectified so that they correspond to an epipolar geometry where corresponding optical axes in the image sensors included in the primary-baseline pair are parallel and where the epipolar lines are corresponding image rows in the rectified images.

The HDR image pairs from both stereo channels are rectified and then processed by a stereo vision processor circuit included in the image-processing circuits 36. The stereo vision processor circuit is configured to perform a stereo correspondence algorithm that computes the disparity between corresponding scene points in the rectified images obtained by the image sensors 18 in each stereo channel and, based on said disparity, calculates the 3D position of the scene points with respect to a position of the image sensors 18.

In more detail, an example sensor unit 16 contains four image sensors 18 that are grouped into two stereo channels, with one channel represented by the first primary-baseline pair comprising the image sensors 18-1 and 18-2, separated by a first distance referred to as the first primary baseline 32-1, and with the other channel represented by the second primary-baseline pair comprising the image sensors 18-3 and 18-4, separated by a second distance referred to as the second primary baseline 32-2.

Multiple raw images from each image sensor 18 are composed together to generate high dynamic range images of the scene captured by the field-of-view 14 of the image sensor 18. The high dynamic range images for each stereo channel are rectified such that they correspond to an epipolar geometry where the corresponding optical axes are parallel, and the epipolar lines are the corresponding image rows. The rectified images are processed by the aforementioned stereo vision processor circuit, which executes a stereo correspondence algorithm to compute the disparity between corresponding scene points, and hence calculate the 3D position of those points with respect to the given position of the sensor unit 16.

In that regard, the primary monitoring zone 12 is a 3D projective volume limited by the common field-of-view (FOV) of the image sensors 18. The maximum size of the disparity search window limits the shortest distance measurable by the stereo setup, thus limiting the shortest allowable range of the primary monitoring zone 12. This distance is also referred to as the "Zone of Limited Detection Capability" (ZLDC). Similarly, the maximum distance included within the primary monitoring zone 12 is limited by the error tolerance imposed on the apparatus 10.

Images from the primary-baseline pairs are processed to generate a cloud of 3D points for the primary monitoring zone 12, corresponding to 3D points on the surfaces of objects within the primary monitoring zone 12. This 3D point cloud is further analyzed through data compression, clustering and segmentation algorithms, to determine whether or not an object of a defined minimum size has entered the primary monitoring zone 12. Of course, the primary monitoring zone 12, through configuration of the processing logic of the apparatus 10, may include different levels of alerts and number and type of monitoring zones, including non-safety critical warning zones and safety-critical protection zones.

In the example distributed architecture shown in FIG. 1, the control unit 20 processes intrusion signals from one or more sensor units 16 and correspondingly controls one or more machines, e.g., hazardous machines in the primary monitoring zone 12, or provides other signaling or status information regarding intrusions detected by the sensor units 16. While the control unit 20 also may provide power to the sensor units 16 through the communication links 22 between it and the sensor units 16, the sensor units 16 also may have separate power inputs, e.g., in case the user does not wish to employ PoE connections. Further, while not shown, an "endspan" unit may be connected as an intermediary between the control unit 20 and given ones of the sensor units 16, to provide for localized powering of the sensor units 16, I/O expansion, etc.

Whether an endspan unit is incorporated into the apparatus, some embodiments of the control unit 20 are configured to support "zone selection," wherein the data or signal pattern applied to a set of "ZONE SELECT" inputs of the control unit 20 dynamically control the 3D boundaries monitored by the sensor units 16 during runtime of the apparatus 10. The monitored zones are set up during a configuration process for the apparatus 10. All the zones configured for monitoring by a particular sensor unit 16 are monitored simultaneously, and the control unit 20 associates intrusion status from the sensor unit 16 to selected I/O units 26 in the control unit 20. The mapping between sensor units 16 and their zone or zones and particular I/O units 26 in the control unit 20 is defined during the configuration process. Further, the control unit 20 may provide a global RESET signal input that enables a full system reset for recovery from control unit fault conditions.

Because of their use in safety-critical monitoring applications, the sensor units 16 in one or more embodiments incorporate a range of safety-of-design features. For example, the basic requirements for a Type 3 safety device according to IEC 61496-3 include these items: (1) no single failure may cause the product to fail in an unsafe way—such faults must be prevented or detected and responded to within the specified detection response time of the system; and (2) accumulated failures may not cause the product to fail in an unsafe way—background testing is needed to prevent the accumulation of failures leading to a safety-critical fault.

The dual stereo channels used to detect objects in the primary monitoring zone 12 address the single-failure requirements, based on comparing the processing results from the two channels for agreement. A discrepancy between the two channels indicates a malfunction in one or both of the channels. By checking for such discrepancies within the detection response time of the apparatus 10, the apparatus 10 can immediately go into a safe error condition. Alternatively, a more conservative approach to object detection could also be taken, where detection results from either primary-baseline pair can trigger a machine stop to keep the primary monitoring zone 12 safe. If the disagreement between the two primary-baseline pairs persists over a longer period (e.g., seconds to minutes) then malfunction could be detected, and the apparatus 10 could go into a safe error (fault) condition.

Additional dynamic fault-detection and self-diagnostic operations may be incorporated into the apparatus 10. For example, in some embodiments, the image-processing circuits 36 of the sensor unit 16 include a single stereo vision processing circuit that is configured to perform stereoscopic processing of the image pairs obtained from both stereo channels—i.e., the image pairs acquired from the first primary-baseline pair of image sensors 18-1 and 18-2, and the image pairs acquired from the second primary-baseline pair of image sensors 18-3 and 18-4. The stereos vision processing circuit or "SVP" is, for example, an ASIC or other digital signal processor that performs stereo-vision image processing tasks at high speed.

Fault conditions in the SVP are detected using a special test frame, which is injected into the SVP once per response time cycle. The SVP output corresponding to the test input is compared against the expected result. The test frames are specially constructed to test all safety critical internal functions of the SVP.

The SVP and/or the image-processing circuits 36 may incorporate other mitigations, as well. For example, the image-processing circuits 36 identify "bad" pixels in the image sensors 18 using both raw and rectified images. The image-processing circuits 36 use raw images, as acquired from the image sensors 18, to identify noisy, stuck, or low-sensitivity pixels, and run related bad pixel testing in the background. Test image frames may be used for bad pixel detection, where three types of test image frames are contemplated: (a) a Low-Integration Test Frame (LITF), which is an image capture corresponding to a very low integration time that produces average pixel intensities that are very close to the dark noise level when the sensor unit 16 is operated in typical lighting conditions; (b) a High Integration Test Frame (HITF), which is an image capture that corresponds to one of at least three different exposure intervals; (c) a Digital Test Pattern Frame (DTPF), which is a test pattern injected into the circuitry used to acquire image frames from the image sensors 18. One test image of each type may be captured per response time cycle. In this way, many test images of each type may be gathered and analyzed over the course of the specified background testing cycle (minutes to hours).

Further mitigations include: (a) Noisy Pixel Detection, in which a time series variance of pixel data using a set of many LITF is compared against a maximum threshold; (b) Stuck Pixels Detection (High or Low), where the same time series variance of pixel data using a set of many LITF and HITF is compared against a minimum threshold; (c) Low Sensitivity Pixel Detection, where measured response of pixel intensity is compared against the expected response for HITF at several exposure levels; (d) Bad Pixel Addressing Detection, where image processing of a known digital test pattern is compared against the expected result, to check proper operation of the image processing circuitry; (e) Bad Pixels Identified from Rectified Images, where saturated, under-saturated, and shadowed pixels, along with pixels deemed inappropriate for accurate correlation fall into this category—such testing can be performed once per frame, using run-time image data; (f) Dynamic Range Testing, where pixels are compared against high and low thresholds corresponding to a proper dynamic range of the image sensors 18.

Figure 4:
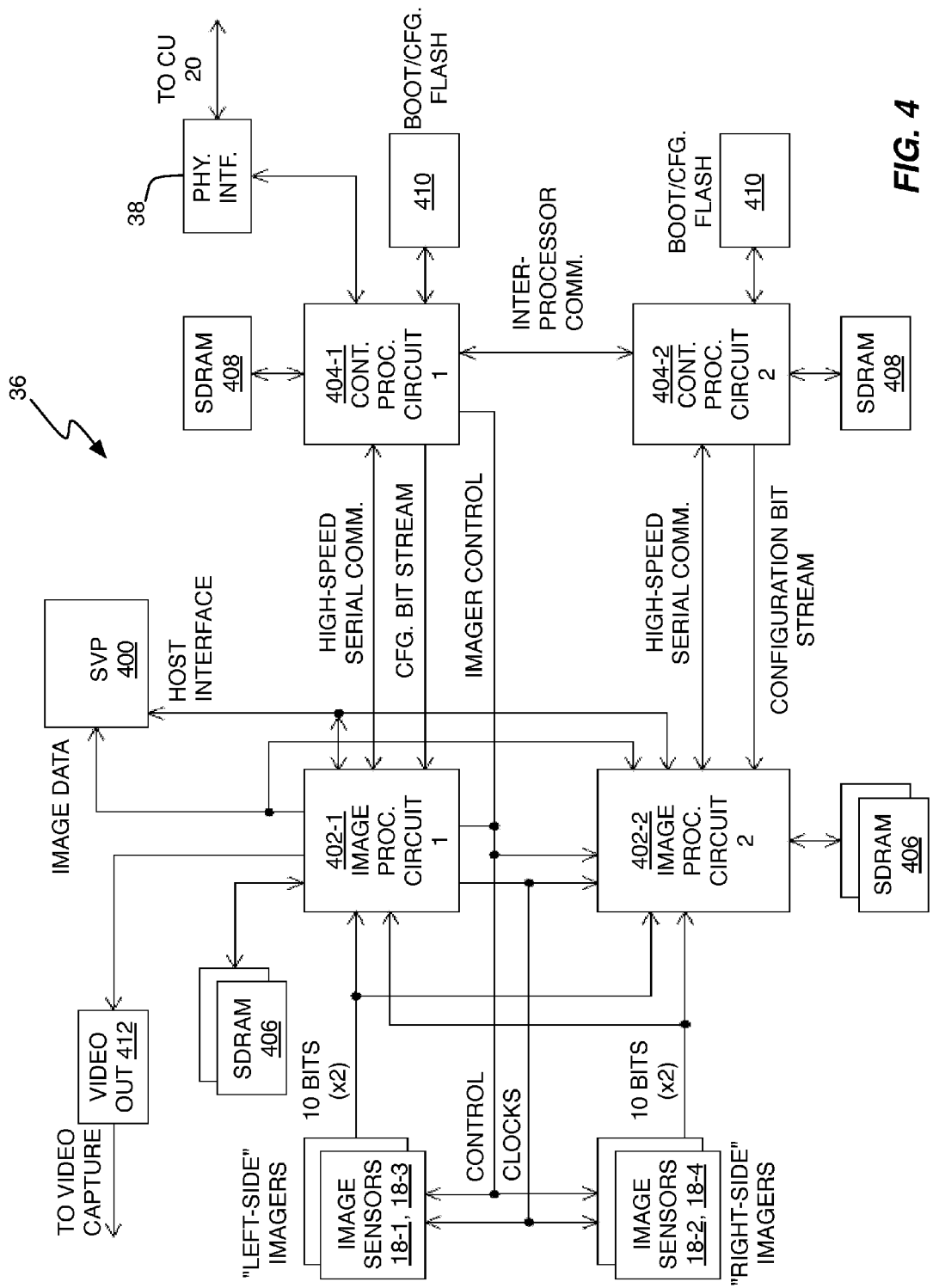
FIG. 4 is a block diagram of one embodiment of image-processing circuits in an example sensor unit.

The above functionality is implemented, for example, using a mix of hardware and software-based circuit configurations, such as shown in FIG. 4, for one embodiment of the image-processing circuits 36 of the sensor unit 16. One sees the aforementioned SVP, identified here as SVP 400, along with multiple, cross-connected processor circuits, e.g., the image processor circuits 402-1 and 402-2 ("image processors), and the control processor circuits 404-1 and 404-2 ("control processors"). In a non-limiting example, the image processors 402-1 and 402-2 are FPGAs, and the control processors 404-1 and 404-2 are microprocessor/microcontroller devices—e.g., a TEXAS INSTRUMENTS AM3892 microprocessor.

The image processors 402-1 and 402-2 include or are associated with memory, e.g., SDRAM devices 406, which serve as working memory for processing image frames from the image sensors 18. They may be configured on boot-up or reset by the respective control processors 404-1 and 404-2, which also include or are associated with working memory (e.g., SDRAM devices 408), and which include boot/configuration data in FLASH devices 410.

The cross-connections seen between the respective image processors 402 and between the respective control processors 404 provide for the dual-channel, redundant monitoring of the primary monitoring zone 12 using the first and second primary-baseline pairs of image sensors 18. In this regard, one sees the "left-side" image sensors 18-1 and 18-3 coupled to the image processor 402-1 and to the image processor 402-2. Likewise, the "right-side" image sensors 18-2 and 18-4 are coupled to both image processors 402.

Further, in an example division of functional tasks, the image processor 402-1 and the control processor 404-1 establish the system timing and support the physical (PHY) interface 38 to the control unit 20, which may be an Ethernet interface. The control processor 404-1 is also responsible for configuring the SVP 400, where the image processor 402-1 acts as a gateway to the SVP's host interface. The control processor 404-1 also controls a bus interface that configures the imager sensors 18. Moreover, the image processor 402-1 also includes a connection to that same bus in order to provide more precision when performing exposure control operations.

In turn, the control processor 404-2 and the image processor 402-2 form a redundant processing channel with respect to above operations. In this role, the image processor 402-2 monitors the clock generation and image-data interleaving of the image processor 402-1. For this reason, both image processors 402 output image data of all image sensors 18, but only the image processor 402-1 generates the image sensor clock and synchronization signals.

The image processor 402-2 redundantly performs the stuck and noisy pixel detection algorithms and redundantly clusters protection-zone violations using depth data captured from the SVP host interface. Ultimately, the error detection algorithms, clustering, and object-tracking results from the image processor 402-2 and the control processor 404-2, must exactly mirror those from image processor 402-1 and the control processor 404-1, or the image-processing circuits 36 will declare a fault, triggering the overall apparatus 10 to enter a fault state of operation.

Each image processor 402 operates with an SDRAM device 406, to support data buffered for entire image frames, such as for high-dynamic-range fusion, noisy pixel statistics, SVP test frames, protection zones, and captured video frames for diagnostics. These external memories also allow the image processors 402 to perform image rectification or multi-resolution analysis, when implemented.

The interface between each control processor 404 and its respective image processor 402 is a high-speed serial interface, such as a PCI-express or SATA type serial interface. Alternatively, a multi-bit parallel interface between them could be used. In either approach, the image-processing circuits 36 use the "host interface" of the SVP 400, both for control of the SVP 400 and for access to the output depth and rectified-image data. The host interface of the SVP 400 is designed to run fast enough to transfer all desired outputs at a speed that is commensurate with the image capture speed.

Further, an inter-processor communication channel allows the two redundant control processors 404 to maintain synchronization in their operations. Although the control processor 404-1 controls the PHY interface 38, it cannot make the final decision of the run/stop state of the apparatus 10 (which in turn controls the run/stop state of a hazardous machine within the primary monitoring zone 12, for example). Instead, the control processor 404-2 also needs to generate particular machine-run unlock codes (or similar values) that the control processor 404-1 forwards to the control unit 20 through the PHY interface 38. The control unit 20 then makes the final decision of whether or not the two redundant channels of the sensor unit 16 agree on the correct machine state. Thus, the control unit 20 sets, for example, the run/stop state of its OSSD outputs to the appropriate run/stop state in dependence on the state indications from the dual, redundant channels of the sensor unit 16. Alternatively, the sensor unit 16 can itself make the final decision of whether or not the two redundant channels of the sensor unit 16 agree on the correct machine state, in another example embodiment.

The inter-processor interface between the control processors 404-1 and 404-2 also provides a way to update the sensor unit configuration and program image for control processor 404-2. An alternative approach would be to share a single flash between the two control processors 404, but that arrangement could require additional circuitry to properly support the boot sequence of the two control processors 404.

As a general proposition, pixel-level processing operations are biased towards the image processors 402, and the use of fast, FPGA-based hardware to implement the image processors 402 complements this arrangement. However, some error detection algorithms are used in some embodiments, which require the control processors 404 to perform certain pixel-level processing operations.

Even here, however, the image processor(s) 402 can indicate "windows" of interest within a given image frame or frames, and send only the pixel data corresponding to the window of interest to the control processor(s) 404, for processing. Such an approach also helps reduce the data rate across the interfaces between the image and control processors 402 and 404 and reduces the required access and memory bandwidth requirements for the control processors 404.

Because the image processor 402-1 generates interleaved image data for the SVP 400, it also may be configured to inject test image frames into the SVP 400, for testing the SVP 400 for proper operation. The image processor 402-2 would then monitor the test frames and the resulting output from the SVP 400. To simplify image processor design, the image processor 402-2 may be configured only to check the CRC of the injected test frames, rather than holding its own redundant copy of the test frames that are injected into the SVP 400.

In some embodiments, the image-processing circuits 36 are configured so that, to the greatest extent possible, the image processors 402 perform the required per-pixel operations, while the control processors 404 handle higher-level and floating-point operations. In further details regarding the allocation of processing functions, the following functional divisions are used.

For image sensor timing generation, one image processor 402 generates all timing, and the other image processor 402 verifies that timing. One of the control processors 404 sends timing parameters to the timing-generation image processor 402, and verifies timing measurements made by the image processor 402 performing timing verification of the other image processor 402.

For HDR image fusion, the image processors 402 buffer and combine image pairs acquired using low- and high-integration sensor exposures, using an HDR fusion function. The control processor(s) 404 provide the image processors 402 with necessary setup/configuration data (e.g, tone-mapping and weighting arrays) for the HDR fusion function. Alternatively, the control processor(s) 402 alternates the image frame register contexts, to achieve a short/long exposure pattern.

For the image rectification function, the image processors 402 interpolate rectified, distortion-free image data, as derived from the raw image data acquired from the image sensors 18. Correspondingly, the control processor(s) 404 generate the calibration and rectification parameters used for obtaining the rectified, distortion-free image data.

One of the image processors 402 provides a configuration interface for the SVP 400. The image processors 402 further send rectified images to the SVP 400 and extract corresponding depth maps (3D range data for image pixels) from the SVP 400. Using an alternate correspondence algorithm, for example, Normalized Cross-Correlation (NCC), the image processors 402 may further refine the accuracy of sub-pixel interpolation, as needed. The control processor(s) 404 configure the SVP 400, using the gateway provided by one of the image processors 402.

For clustering, the image processors 402 cluster foreground and "mitigation" pixels and generate statistics for each such cluster. Correspondingly, the control processor(s) 404 generate protection boundaries for the primary monitoring zone 12—e.g., warning boundaries, safety-critical boundaries, etc., that define the actual 3D ranges used for evaluating whether a detected object triggers an intrusion warning, safety-critical shut-down, etc.

For object persistence, the control processors 404 perform temporal filtering, motion tracking, and object split-merge functions.

For bad pixel detection operations, the image processors 402 maintain per-pixel statistics and interpolation data for bad pixels. The control processor(s) 404 optionally load a factory defect list into the image processors 402. The factory defect list allows, for example, image sensors 18 to be tested during manufacturing, so that bad pixels can be detected and recorded in a map or other data structure, so that the image processors 402 can be informed of known-bad pixels.

For exposure control operations, the image sensors 402 collect global intensity statistics and adjust the exposure timing. Correspondingly, the control processor(s) 404 provide exposure-control parameters, or optionally implement per-frame proportional-integral-derivative (PID) or similar feedback control for exposure.

For dynamic range operations, the image processors 402 generate dynamic-range mitigation bits. Correspondingly, the control processor(s) 404 provide dynamic range limits to the image processors 402.

For shadowing object detection operations, the image processors 402 create additional transformed images, if necessary, and implement, e.g., a pixel-matching search to detect image differences between the image data acquired by the two image sensors 18 in each secondary-baseline pair. For example, pixel-matching searches are used to compare the image data acquired by the image sensor 18-1 with that acquired by the image sensor 18-3, where those two sensors 18-1 and 18-3 comprise the first secondary-baseline pair. Similar comparisons are made between the image data acquired by the second secondary-baseline pair, comprising the image sensors 18-2 and 18-4. In support of shadowing object detection operations, the control processor(s) 404 provide limits and/or other parameters to the image sensors 402.

For reference marker detection algorithms, the image processors 402 create distortion-free images, implement NCC searches over the reference markers within the image data, and find the best match. The control processors 404 use the NCC results to calculate calibration and focal length corrections for the rectified images. The control processor(s) 404 also may perform bandwidth checks (focus) on windowed pixel areas. Some other aspects of reference maker mitigation algorithm may also require rectified images.

In some embodiments, the SVP 400 may perform image rectification, but there may be advantages to performing image rectification in the image processing circuit 402. For example, such processing may more naturally reside in the image processors 402 because it complements other operations performed by them. For example, the image sensor bad-pixel map (stuck or noisy) must be rectified in the same manner as the image data. If the image processors 402 already need to implement rectification for image data, it may make sense for them to rectify the bad pixel maps, to insure coherence between the image and bad-pixel rectification.

Further, reference-marker tracking works best, at least in certain instances, with a distortion-free image that is not rectified. The interpolation logic for removing distortion is similar to rectification, so if the image processors 402 create distortion-free images, they may include similarly-configured additional resources to perform rectification.

Additionally, shadowing-object detection requires at least one additional image transformation for each of the secondary baselines 34-1 and 34-2. The SVP 400 may not have the throughput to do these additional rectifications, while the image processors 402 may be able to comfortably accommodate the additional processing.

Another aspect that favors the consolidation of most pixel-based processing in the image processors 402 relates to the ZLDC. One possible way to reduce the ZLDC is to use a multi-resolution analysis of the image data. For example, an image reduced by a factor of two in linear dimensions is input to the SVP 400 after the corresponding "normal" image is input. This arrangement would triple the maximum disparity realized by the SVP 400.

In another aspect of stereo correlation processing performed by the SVP 400 (referred to as "stereoscopic processing"), the input to the SVP 400 is raw or rectified image pairs. The output of the SVP 400 for each input image pair is a depth (or disparity) value for each pixel, a correlation score and/or interest operator bit(s), and the rectified image data. The correlation score is a numeric figure that corresponds to the quality of the correlation and thus provides a measure of the reliability of the output. The interest operator bit provides an indication of whether or not the pixel in question meets predetermined criteria having to do with particular aspects of its correlation score.

Clustering operations, however, are easily pipelined and thus favor implementation in FGPA-based embodiments of the image processors 402. As noted, the clustering process connects foreground pixels into "clusters," and higher levels of the overall object-detection algorithm implemented by the image-processing circuits 36 determine if the number of pixels, size, and pixel density of the cluster make it worth tracking.

Once pixel groups are clustered, the data rate is substantially less than the stream of full-depth images. Because of this fact and because of the complexity of tracking objects, the identification and tracking of objects is advantageously performed in the control processors 404, at least in embodiments where microprocessors or DSPs are used to implement the control processors 404.

With bad pixel detection, the image-processing circuits 36 check for stuck (high/low) pixels and noisy pixels using a sequence of high- and low-integration test frames. Bad pixels from the stuck-pixel mitigation are updated within the detection response time of the apparatus 10, while the algorithm requires multiple test frames to detect noisy pixels. These algorithms work on raw image data from the image sensors 18.

The stuck-pixel tests are based on simple detection algorithms that are easily supported in the image processors 402, however, the noisy-pixel tests, while algorithmically simple, require buffering of pixel statistics for an entire image frame. Thus, to the extent that the image processors 402 do such processing, they are equipped with sufficient memory for such buffering.

More broadly, in an example architecture, the raw image data from the image sensors 18 only flows from the image sensors 18 to the image processors 402. Raw image data need not flow from the image processors 402 to the control processors 404. However, as noted, the bad image sensor pixels must undergo the same rectification transformation as the image pixels, so that the clustering algorithm can apply them to the correct rectified-image coordinates. In this regard, the image processors 402 must, for bad pixels, be able to minor the same rectification mapping done by the SVP 400.

When bad pixels are identified, their values are replaced with values interpolated from neighboring "good" pixels. Since this process requires a history of multiple scan lines, the process can be pipelined and is suitable for implementation in any FPGA-based version of the image processors 402.

While certain aspects of bad pixel detection are simple algorithmically, shadowing object detection comprises a number of related functions, including: (a) intensity comparison between the image sensors 18 in each secondary baseline pair; (b) post processing operations such as image morphology to suppress false positives; (c) detection of horizontal lines that could represent a uniform shadowing object that extends beyond the protection zone and continues to satisfy (a) above.

The reference-marker-based error detection algorithms are designed to detect a number of conditions including loss of focus, loss of contrast, loss of image sensor alignment, loss of world (3D coordinate) registration, and one or more other image sensor errors.

Figure 5:
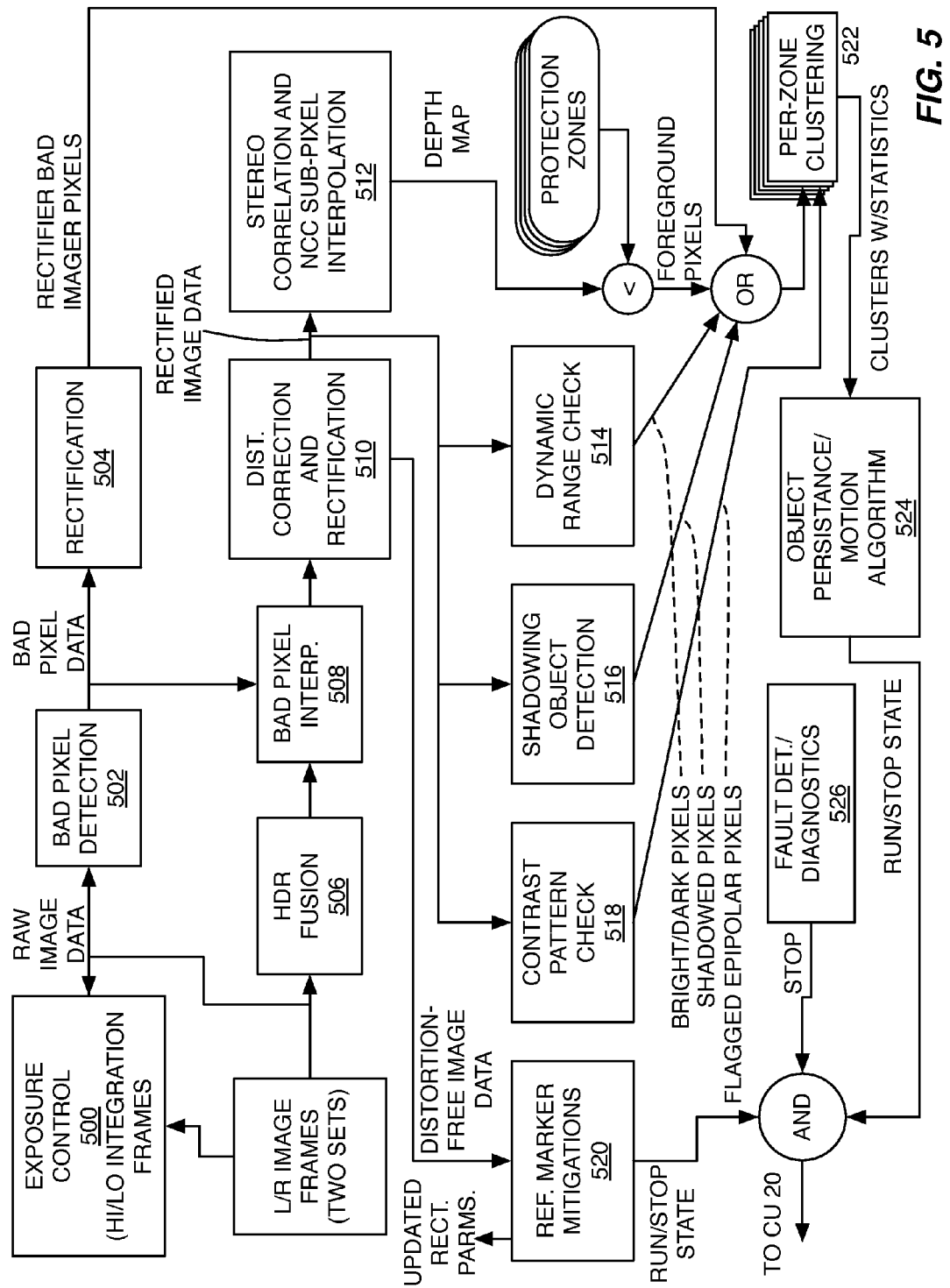
FIG. 5 is a block diagram of one embodiment of functional processing blocks realized in the image-processing circuits of FIG. 4, for example.

FIG. 5 illustrates "functional" circuits or processing blocks corresponding to the above image-processing functions, which also optionally include a video-out circuit 412, to provide output video corresponding to the fields-of-view 14 of the image sensors 18, optionally with information related to configured boundaries, etc. It will be understood that the illustrated processing blocks provided in the example of FIG. 5 are distributed among the image processors 402 and the control processors 404.

With that in mind, one sees functional blocks including these items: an exposure control function 500, a bad pixel detection function 502, a bad-pixel rectification function 504, an HDR fusion function 506, a bad-pixel interpolation function 508, an image distortion-correction-and-rectification function 510, a stereo-correlation-and-NCC-sub-pixel-interpolation function 512, a dynamic range check function 514, a shadowing object detection function 516, a contrast pattern check function 518, a reference marker mitigations function 520, a per-zone clustering function 522, an object persistence and motion algorithm function 524, and a fault/diagnostics function 526. Note that one or more of these functions may be performed redundantly, in keeping with the redundant object detection based on the dual-channel monitoring of the primary monitoring zone 12.

Image capture takes place in a sequence of continuous time slices—referred to as "frames." As an example, the image-processing circuits 36 operate at a frame rate of 60 fps. Each baseline 32 or 34 corresponds to a pair of image sensors 18, e.g., a first pair comprising image sensors 18-1 and 18-2, a second pair comprising image sensors 18-3 and 18-4, a third pair comprising image sensors 18-1 and 18-3, and a fourth pair comprising image sensors 18-2 and 18-4.

Raw image data for each baseline are captured simultaneously. Noisy, stuck or low sensitivity pixels are detected in raw images and used to generate a bad pixel map. Detected faulty pixel signals are corrected using an interpolation method utilizing normal neighboring pixels. This correction step minimizes the impact of faulty pixels on further stages of the processing pipeline.

High and low exposure images are taken in sequence for each baseline pair. Thus, each sequence of image frames contains alternate high and low exposure images. One or two frames per response time cycle during the image stream will be reserved for test purposes, where "image stream" refers to the image data flowing on a per-image frame basis from each pair of image sensors 18.

High and low exposure frames from each image sensor 18 are combined into a new image, according to the HDR fusion process described herein. The resulting HDR image has an extended dynamic range and is called a high dynamic range (HDR) frame. Note that the HDR frame rate is now 30 Hz, as it takes two raw images taken at different exposures, at a 60 Hz rate, to create the corresponding HDR image. There is one 30 Hz HDR image stream per imager or 30 Hz HDR image pair per baseline.

The images are further preprocessed to correct optical distortions, and they also undergo a transformation referred to in computer vision as "rectification." The resulting images are referred to as "rectified images" or "rectified image data." For reference, one sees such data output from functional block 510. The bad pixel map also undergoes the same rectification transformations, for later use—see the rectification block 504. The resulting bad pixel data contains pixel weights that may be used during the clustering process.

The rectified image data from functional block 510 is used to perform a number of checks, including: a dynamic range check, where the pixels are compared against saturation and under-saturation thresholds and flagged as bad if they fall outside of these thresholds; and a shadowing object check, where the images are analyzed to determine whether or not an object is present in the ZLDC, or in "Zone of Side Shadowing" (ZSS). Such objects, if present, might cast a shadow in one or more of the sensor fields-of-view 14, effectively making the sensor unit 16 blind to objects that might lie in that shadow. Groups of pixels corresponding to a shadowed region are flagged as "bad", in order to identify this potentially dangerous condition.

Such operations are performed in the shadowing object detection function 516. Further checks include a bad contrast pattern check—here the images are analyzed for contrast patterns that could make the resulting range measurement unreliable. Pixels failing the test criteria are flagged as "bad." In parallel, rectified images are input to the SVP 400—represented in FIG. 5 in part by Block 512. If the design is based on a single SVP 400, HDR image frames for each primary baseline 32-1 and 32-2 are alternately input into the SVP 400 at an aggregate input rate of 60 Hz. To do so, HDR frames for one baseline 32-1 or 32-2 are buffered while the corresponding HDR frames for the other baseline 32-1 or 32-2 are being processed by the SVP 400. The range data are post-processed to find and reject low quality range points, and to make incremental improvements to accuracy, and then compared with a defined detection boundary.

Pixels whose 3D range data puts them within the detection boundary are grouped into clusters. Bad pixels, which are directly identified or identified through an evaluation of pixel weights, are also included in the clustering process. The clustering process can be performed in parallel for multiple detection boundaries. The sizes of detected clusters are compared with minimum object size, and clusters meeting or exceeding the minimum object size are tracked over the course of a number of frames to suppress erroneous false detections. If a detected cluster consistent with a minimum sized object persists over a minimum period of time (i.e., a defined number of consecutive frames), the event is classified as an intrusion. Intrusion information is sent along with fault status, as monitored from other tests, to the control unit 20, e.g., using a safe Ethernet protocol.

Reference marker monitoring, as performed in Block 520 and as needed as a self-test for optical faults, is performed using rectified image data, in parallel with the object detection processing. The reference-marker monitoring task not only provides a diagnostic for optical failures, but also provides a mechanism to adjust parameters used for image rectification, in response to small variations in sensitivity due to thermal drift.

Further, a set of background and runtime tests provide outputs that are also used to communicate the status of the sensor unit 16 to the control unit 20. Further processing includes an exposure control algorithm running independent from the above processing functions—see Block 500. The exposure control algorithm allows for adjustment in sensitivity to compensate for slowly changing lighting conditions, and allows for coordinate-specific tests during the test frame period.

While the above example algorithms combine advantageously to produce a robust and safe machine vision system, they should be understood as non-limiting examples subject to variation. Broadly, object detection processing with respect to the primary monitoring zone 12 uses stereoscopic image processing techniques to measure 3D Euclidean distance.

As such, the features of dual baselines, shadowing detection, and high dynamic range imaging, all further enhance the underlying stereoscopic image processing techniques. Dual baselines 32-1 and 32-2 for the primary monitoring zone 12 provide redundant object detection information from the first and second stereo channels. The first stereo channel obtains first baseline object detection information, and the second stereo channel obtains second baseline object detection information. The object detection information from the first baseline is compared against the object detection information from the second baseline. Disagreement in the comparison indicates a malfunction or fault condition.

While the primary baselines 32 are used for primary object detection in the primary monitoring zone 12, the secondary baselines 34 are used for shadowing object detection, which is performed to ensure that a first object in close proximity to the sensor unit 16 does not visually block or shadow a second object farther away from the sensor unit 16. This includes processing capability needed to detect objects detected by one image sensor 18 that are not detected by another image sensor 18.

Figure 6:
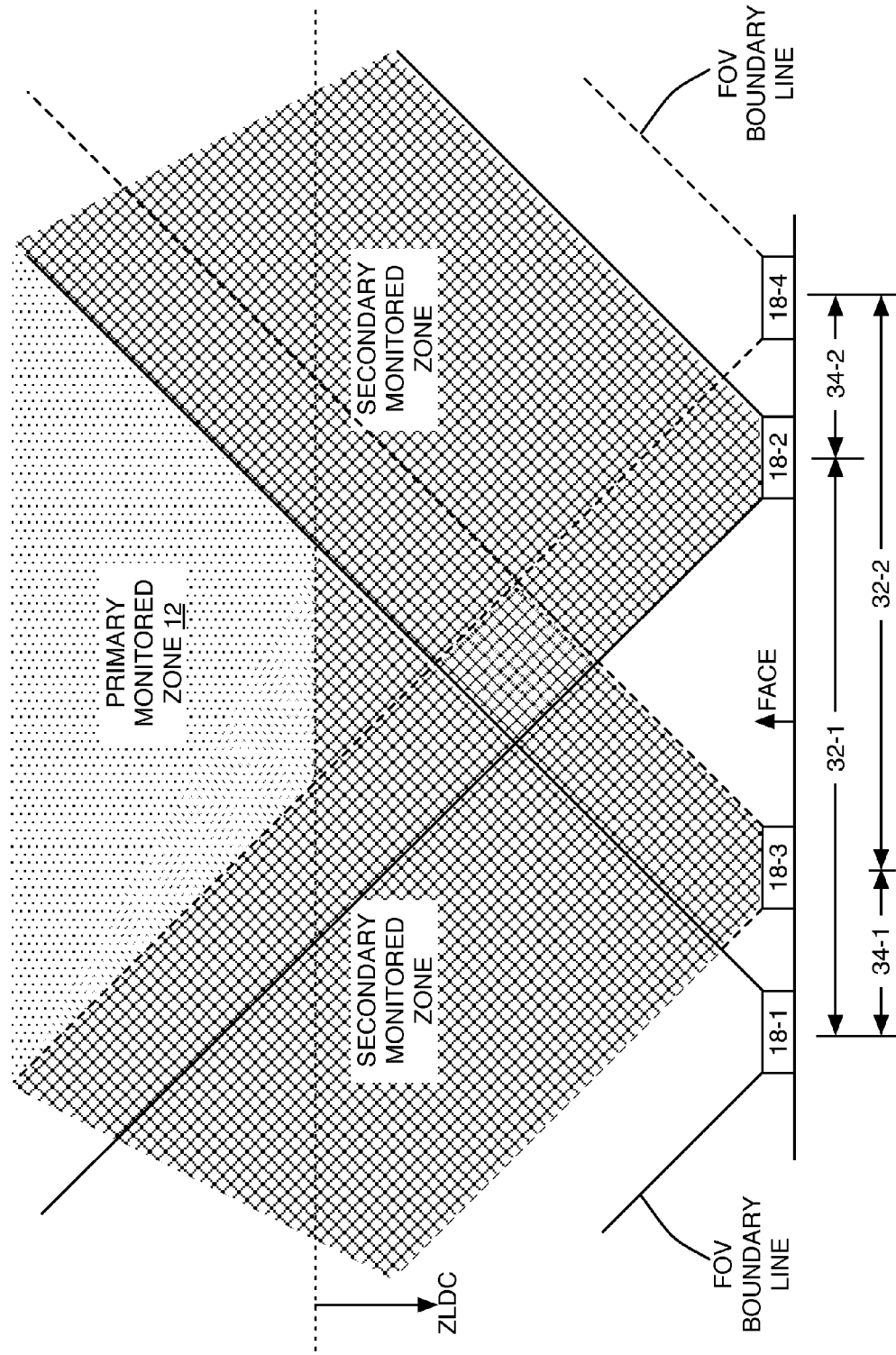
FIG. 6 is a diagram of the various zones defined by the sensor fields-of-view of an example sensor unit.

FIGS. 6 and 7A/B provide helpful illustrations regarding shadowing object detection, and the ZLDC and ZSS regions. In one or more embodiments, and with specific reference to FIG. 6, the image sensors 18-1 and 18-2 are operated as a first stereo pair providing pairs of stereo images for processing as a first stereo channel, the image sensors 18-3 and 18-4 are operated as a second stereo pair providing pairs of stereo images for processing as a second stereo channel, the image sensors 18-1 and 18-3 are operated as a third stereo pair providing pairs of stereo images for processing as a third stereo channel, and the image sensors 18-2 and 18-4 are operated as a fourth stereo pair providing pairs of stereo images for processing as a fourth stereo channel. The first and second pairs are separated by the primary baselines 32-1 and 32-2, respectively, while the third and four stereo pairs are separated by the secondary baselines 34-1 and 34-2, respectively.

As noted earlier herein, the primary object ranging technique employed by the image-processing circuits 36 of a sensor unit 16 is stereo correlation between two image sensors 18 located at two different vantage points, searching through epipolar lines for the matching pixels and calculating the range based on the pixel disparity.

This primary object ranging technique is applied at least to the primary monitoring zone 12, and FIG. 6 illustrates that the first and second stereo channels are used to detect objects in a primary monitoring zone 12. That is, objects in the primary monitoring zone 12 are detected by correlating the images captured by the first image sensor 18-1 with images captured by the second image sensor 18-2 (first stereo channel) and by correlating images captured by the third image sensor 18-3 with images captured by the fourth image sensor 18-4 (second stereo channel). The first and second stereo channels thus provide redundant detection capabilities for objects in the primary monitoring zone 12.

The third and fourth stereo channels are used to image secondary monitoring zones, which encompass the sensor fields-of-view 14 that are (1) inside the ZLDC and/or (2) within one of the ZSS. In this regard, it should be understood that objects of a given minimum size that are in the ZLDC are close enough to be detected using disparity-based detection algorithms operating on the image pairs acquired by each of the secondary-baseline pairs. However, these disparity-based algorithms may not detect objects that are beyond the ZLDC limit but within one of the ZSS (where the object does not appear in all of the sensor fields-of-view 14), because the observed image disparities decrease as object distance increases. One or both of two risk mitigations may be used to address shadowing object detection in the ZSS.

First, as is shown in FIG. 8, the sensor unit 16 may be configured so that the verging angles of the image sensors 18 are such that the ZSS are minimized. Second, objects in the ZSS can be detected using stereo correlation processing for the images captured by the first and second secondary-baseline pairs. That is, the image processing circuits 16 may be configured to correlate images captured by the first image sensor 18-1 with images captured by the third image sensor 18-3 (third stereo channel), and correlate images captured by the second image sensor 18-2 with images captured by the fourth image sensor 18-4 (fourth stereo channel). Thus, the image processing circuits 36 use stereo correlation processing for the image data acquired from the first and second stereo channels (first and second primary-baseline pairs of image sensors 18), for object detection in the primary monitoring zone 12, and use either or both of intensity-difference and stereo-correlation processing for the image data acquired from the third and fourth stereo channels (first and second secondary-baseline pairs of image sensors 18), for object detection in the ZLDC and ZSS.

As shown by way of example in FIGS. 7A and 7B, the third and fourth stereo channels are used to detect objects in the secondary monitored zones, which can shadow objects in the primary monitoring zone 12. The regions directly in front of the sensor unit 16 and to either side of the primary monitoring zone 12 cannot be used for object detection using the primary-baseline stereo channels—i.e., the first and second stereo channels corresponding to the primary baselines 32-1 and 32-2.

For example, FIG. 7B illustrates a shadowing object "1" that is in between the primary monitoring zone 12 and the sensor unit 16—i.e., within the ZLDC—and potentially shadows objects within the primary monitoring zone 12. In the illustration, one sees objects "A" and "B" that are within the primary monitoring zone 12 but may not be detected because they lie within regions of the primary monitoring zone 12 that are shadowed by the shadowing object "1" with respect to one or more of the image sensors 18.

FIG. 7B further illustrates another shadowing example, where an object "2" is beyond the minimum detection range (beyond the ZLDC border) but positioned to one side of the primary monitoring area 12. In other words, object "2" lies in one of the ZSS, and thus casts a shadow into the primary monitoring zone 12 with respect to one or more of the image sensors 18 on the same side. Consequently, an object "C" that is within the primary monitoring zone 12 but lying within the projective shadow of object "2" may not be reliably detected.

Thus, while shadowing objects may not necessarily be detected at the same ranging resolution as provided for object detection in the primary monitoring zone 12, it is important for the sensor unit 16 to detect shadowing objects. Consequently, the image-processing circuits 36 may be regarded as having a primary object detection mechanism for full-resolution, redundant detection of objects within the primary monitoring zone 12, along with a secondary object detection mechanism, to detect the presence of objects inside the ZLDC, and a third object detection mechanism, to detect the presence of objects in ZSS regions. The existence of verging angles between the left and right side impose a final image sensor/FOV configuration, such as example of FIG. 8. The verging angles may be configured so as to eliminate or substantially reduce the ZSS on either side of the primary monitoring zone 12, so that side-shadowing hazards are reduced or eliminated.

Object detection for the ZLDC region is based on detecting whether there are any significant differences between adjacent image sensors 18 located at each side of the sensor unit 16. For example, such processing involves the comparison of image data from the image sensor 18-1 with that of the image sensor 18-3. (Similar processing compares the image data between the image sensors 18-2 and 18-4.) When there is an object close to the sensor unit 16 and in view of one of these closely spaced image sensor pairs, a simple comparison of their respective pixel intensities within a neighborhood will reveal significant differences. Such differences are found by flagging those points in one image that do not have intensity matches inside a given search window corresponding to the same location in the other image. The criteria that determine a "match" are designed in such a way that makes the comparison insensitive to average gain and/or noise levels in each imager.

As another example, the relationship between the secondary (short) and primary (long) baseline lengths, t and T, respectively, can be expressed as t/T=D/d. Here, D is the maximum disparity search range of the primary baseline, and d is search window size of the image difference algorithm.

This method is designed to detect objects inside of and in close proximity to the ZLDC region. Objects far away from the ZLDC region will correspond to very small disparities in the image data, and thus will not produce such significant differences between when the images from a closely spaced sensor pair are compared. To detect objects possibly beyond the ZLDC boundary but to one side of the primary monitoring zone 12, the closely spaced sensor pairs may be operated as stereo pairs, with their corresponding stereo image pairs processed in a manner that searches for objects only within the corresponding ZSS region.

Of course, in all or some of the above object detection processing, the use of HDR images allows the sensor unit 16 to work over a wider variety of ambient lighting conditions. In one example of an embodiment for HDR image fusion, the image-processing circuits 36 perform a number of operations. For example, a calibration process is used as a characterization step to recover the inverse image sensor response function (CRF), g: Z→R required at the manufacturing stage. The domain of g is 10-bit (imager data resolution) integers ranging from 0-1023 (denoted by Z). The range is the set of real numbers, R.

At runtime, the CRF is used to combine the images taken at different (known) exposures to create an irradiance image, E. From here, the recovered irradiance image is tone mapped using the logarithmic operator, and then remapped to a 12-bit intensity image, suitable for processing by the SVP 400.

Several different calibration/characterization algorithms to recover the CRF are contemplated. See, for example, the works of P. Debevec and J. Malik, "Recovering High Dynamic Range Radiance Maps from Photographs", SIGGRAPH 1998 and T. Mitsunaga and S. Nayar, "Radiometric Self Calibration", CVPR 1999.

In any case, the following pseudo-code summarizes an example HDR fusion algorithm, as performed at runtime. Algorithm inputs include: CRF g, Low exposure frame $I_L$, low exposure time $t_L$, high exposure frame $I_H$, and high exposure time $t_H$. The corresponding algorithm output is a 12-bit Irradiance Image, E.

For each pixel p, $$\ln E(p) = \frac{[w(I_L)(g(I_L) - \ln t_L)] + [w(I_H)(g(I_H) - \ln t_H)]}{w(I_L) + w(I_H)},$$

where w:Z→R is a weighting function (e.g., Guassian, hat, etc.). The algorithm continues with mapping ln E(p)→[0, 4096] to obtain a 12-bit irradiance image, E, which will be understood as involving offset and scaling operations.

Because the run-time HDR fusion algorithm operates on each pixel independently, the proposed HDR scheme is suitable for implementation on essentially any platform that supports parallel, processing. For this reason, FPGA-based implementation of the image processors 402 becomes particularly advantageous.

Of course, these and other implementation details can be varied, at least to some extent, in dependence on performance requirements and application details. Broadly, it is taught herein to use a method of projective volume monitoring that includes acquiring image data from four image sensors 18 having respective sensor fields-of-view that all overlap a primary monitoring zone 12. The image sensor 18 arranged so that first and second image sensors 18-1 and 18-2 form a first primary-baseline pair whose spacing defines a first primary baseline, third and fourth image sensors 18-3 and 18-4 form a second primary-baseline pair whose spacing defines a second primary baseline, and further arranged so that the first and third image sensors 18-1 and 18-3 form a first secondary-baseline pair whose spacing defines a first secondary baseline, and the second and fourth image sensors 18-2 and 18-4 form a second secondary-baseline pair whose spacing defines a second secondary baseline, wherein the primary baselines are longer than the secondary baselines.

In an example arrangement, the four image sensors are arranged as two left-side image sensors 18 spaced at the first secondary baseline, to form the first secondary-baseline pair, and two-right side-image sensors 18 spaced at the second secondary baseline, to form the second secondary-baseline pair. The four image sensors 18 are further arranged such that one left-side image sensor 18 is paired with one right-side image sensor 18 to form the first primary baseline pair spaced at the first primary baseline, while the other left-side image sensor 18 is paired with the other right-side image sensor 18 to form the second primary baseline pair spaced at the second primary baseline. Here, "left-side" and "right-side" are relative terms, meaning that there are respective pairs of image sensors 18 that are spaced relatively close together, while at the same time those respective pairs are spaced a longer distance apart with respect to each other. Thus, a vertical arrangement could be used, where the terms "left" and "right" are equivalent to "top" and "bottom."

With reference back to FIG. 2, one left-side image sensor 18-1 is paired with one right-side image sensor 18-2 to form a first primary baseline pair spaced at a first primary baseline 32-1. Similarly, the other left-side image sensor 18-3 is paired with the other right-side image sensor 18-4, to form a second primary baseline pair spaced at a second primary baseline 32-2.

Based on this advantageous physical arrangement of image sensors and the associated functional pairings of image data from them, the method includes redundantly detecting objects in the primary monitoring zone based on stereoscopic processing of the image data from each of the primary-baseline pairs. Still further, the method includes advantageous mitigation of the risks arising from shadowing objects, by detecting shadowing objects based on processing the image data from each of the secondary-baseline pairs.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A projective volume monitoring apparatus comprising a sensing unit that includes:
   four image sensors having respective sensor fields-of-view that all overlap a primary monitoring zone and arranged so that first and second image sensors form a first primary-baseline pair whose spacing defines a first primary baseline, third and fourth image sensors form a second primary-baseline pair whose spacing defines a second primary baseline, and further arranged so that the first and third image sensors form a first secondary-baseline pair whose spacing defines a first secondary baseline, and the second and fourth imaging sensors form a second secondary-baseline pair whose spacing defines a second secondary baseline, wherein the primary baselines are longer than the secondary baselines; and
   image-processing circuits configured to redundantly detect objects within the primary monitoring zone using image data acquired from the primary-baseline pairs, and further configured to detect shadowing objects using image data acquired from the secondary-baseline pairs, wherein a shadowing object obstructs one or more of the sensor fields-of-view with respect to the primary monitoring zone;
   wherein the image-processing circuits of the sensing unit are configured to redundantly detect objects within the primary monitoring zone by detecting the presence of such objects in first range data derived via stereoscopic image processing of the image data acquired by the first primary-baseline pair and in second range data derived via stereoscopic image processing of the image data acquired by the second primary-baseline pair, and evaluating the first and second range data for agreement.

2. The projective volume monitoring apparatus of claim 1, wherein the primary monitoring zone is bounded by a minimum detection distance representing a minimum range from the sensor unit at which the sensor unit detects objects using the primary-baseline pairs.

3. The projective volume monitoring apparatus of claim 1, wherein the image-processing circuits of the sensor unit are configured to detect shadowing objects by, for each secondary-baseline pair, detecting intensity differences between individual pixels in an image acquired from one of the image sensors in the secondary baseline pair with a corresponding neighborhood of pixels in an image acquired by the other one of the image sensors in the secondary-baseline pair.

4. The projective volume monitoring apparatus of claim 1, wherein the image sensors are configured to acquire image frames, including low-exposure image frames and high-exposure image frames, and wherein the image-processing circuits are, at least with respect to the image frames acquired by the primary baseline pairs, fuse corresponding low- and high-exposure image frames to obtain high dynamic range (HDR) images, and to stereoscopically process streams of said HDR images from each of the primary-baseline pairs, for redundant detection of objects in the primary monitoring zone.

5. The projective volume monitoring apparatus of claim 4, wherein each primary baseline pair represents a stereo channel, and wherein the HDR images from each stereo channel are rectified so that they correspond to an epipolar geometry where corresponding optical axes in the image sensors included in the primary-baseline pair are parallel and where the epipolar lines are corresponding image rows in the rectified images.

6. The projective volume monitoring apparatus of claim 5, wherein the image-processing circuits include a stereo vision processor circuit that is configured to perform a stereo correspondence algorithm that computes the disparity between corresponding scene points in the rectified images obtained by the image sensors in each stereo channel and, based on said disparity, calculates the 3D position of said scene points with respect to a position of the image sensors.

7. The projective volume monitoring apparatus of claim 1, wherein the image-processing circuits are configured to generate rectified and distortion-corrected image data from raw image data acquired from the image sensors, and further configured to generate bad-pixel maps for said image sensors that are transformed according to the same rectification and distortion-correction algorithms as used for the raw image data, to maintain coherence between the bad-pixel maps and the rectified and distortion-corrected image data.

8. The projective volume monitoring apparatus of claim 7, wherein the image-processing circuits are configured to form the rectified and distortion-corrected image data from High Dynamic Range (HDR) image data created by fusing corresponding low-exposure and high-exposure image frames for each of the image sensors.

9. The projective volume monitoring apparatus of claim 7, wherein the bad-pixel maps comprise, for each image sensor, indications of stuck or noisy pixels detected from raw image data acquired from the image sensors, and wherein the image-processing circuits are further configured to further include in each bad-pixel maps indications of pixels that fail dynamic range testing in which pixels in the rectified and distortion-corrected image data obtained for a given image sensor are checked against a saturation threshold and an under-saturation threshold.

10. The projective volume monitoring apparatus of claim 7, wherein the bad-pixel maps comprise, for each image sensor, indications of stuck or noisy pixels detected from raw image data acquired from the image sensors, and wherein the image-processing circuits are further configured to further include in each bad-pixel maps indications of pixels that fail a contrast check performed by the image-processing circuits.

11. The projective volume monitoring apparatus of claim 7, wherein the image-processing circuits include a stereo vision processor that is configured to perform stereoscopic processing of rectified and distortion-corrected image data from the image sensors comprising each primary-baseline pair, and to generate corresponding depth maps comprising 3D range data corresponding to the pixels comprising such image data, and wherein the image-processing circuits are further configured to use the depth maps to detect clusters of pixels that are within one or more defined range boundaries, to compare any detected clusters against a defined minimum object size, and to track any detected cluster that meets the minimum object size to determine if it persists over one or more temporal filtering periods and, if so, to indicate an object intrusion event to a control unit that is further included in the projective volume monitoring apparatus.

12. The projective volume monitoring apparatus of claim 1, wherein, for redundantly detecting objects within the primary monitoring zone using the image data acquired from the primary-baseline pairs, the image processing circuits include a single stereo vision processor that performs stereoscopic processing of image pairs from each primary-baseline pair, and further wherein the image processing circuits are configured to periodically inject a test image into the stereo vision processor, as a mechanism for verifying proper operation of the stereo vision processor.

13. The projective volume monitoring apparatus of claim 1, wherein at least one of the following configurations is used to mitigate object shadowing risks arising from zones of side shadowing on either side of the primary monitoring area:
the sensor unit is configured to have verging angles for its image sensors that minimize the zones of side shadowing; or
the image processing circuits are configured to perform stereo correlation processing for the image data acquired by each of the secondary-baseline pairs, for object detection within the zones of side shadowing.

14. The projective volume monitoring apparatus of claim 1, wherein D represents a maximum disparity search range used for stereo correlation processing of the image data acquired from the primary-baseline pairs, for object detection in the primary monitoring zone, wherein d represents a search window size used for an image difference algorithm applied to the image data acquired from each secondary-baseline pair, for shadowing object detection, wherein T represents a length of the first and second primary baselines, wherein t represents a length of the first and second secondary baselines, and wherein the sensor unit is configured so that $t/T=D/d$.

15. A method in a projective volume monitoring apparatus of projective volume monitoring, the method comprising:
acquiring image data from four image sensors of the projective volume monitoring apparatus, the four image sensors having respective sensor fields-of-view that all overlap a primary monitoring zone and arranged so that first and second image sensors form a first primary-baseline pair whose spacing defines a first primary baseline, third and fourth image sensors form a second primary-baseline pair whose spacing defines a second primary baseline, and further arranged so that the first and third image sensors form a first secondary-baseline pair whose spacing defines a first secondary baseline, and the second and fourth imaging sensors form a second secondary-baseline pair whose spacing defines a second secondary baseline, wherein the primary baselines are longer than the secondary baselines;
redundantly detecting objects in the primary monitoring zone based on stereoscopic processing of the image data from each of the primary-baseline pairs; and
detecting shadowing objects based on processing the image data from each of the secondary-baseline pairs, wherein a shadowing object obstructs one or more of the sensor fields-of-view with respect to the primary monitoring zone;
wherein redundantly detecting objects in the primary monitoring zone based on stereoscopic processing of the image data from each of the primary-baseline pairs comprises detecting the presence of such objects in first range data derived via stereoscopic image processing of the image data acquired by the first primary-baseline pair and in second range data derived via stereoscopic image processing of the image data acquired by the second primary-baseline pair, and evaluating the first and second range data for agreement.

16. The method of claim 15, wherein detecting shadowing objects comprises, for either secondary-baseline pair, detecting intensity differences between individual pixels in an image acquired from one of the image sensors in the secondary baseline pair with a corresponding neighborhood of pixels in an image acquired by the other one of the image sensors in the secondary-baseline pair.

17. The method of claim 15, wherein detecting shadowing objects comprises, for either secondary-baseline pair, performing stereoscopic processing of the image data acquired by the two image sensors comprising the secondary-baseline pair, and evaluating corresponding range data obtained therefrom.

18. The method of claim 15, further comprising acquiring image data from each image sensor using low-exposure image frames and high-exposure image frames, and fusing corresponding low- and high-exposure image frames to obtain high dynamic range (HDR) images, and stereoscopically processing streams of said HDR images from each of the primary-baseline pairs, for redundant detection of objects in the primary monitoring zone.

19. The method of claim 15, further comprising generating rectified and distortion-corrected image data from raw image data acquired from the image sensors, and generating bad-pixel maps for said image sensors that are transformed according to the same rectification and distortion-correction algorithms as used for the raw image data, to maintain coherence between the bad-pixel maps and the rectified and distortion-corrected image data.

20. The method of claim 19, wherein the bad-pixel maps comprise, for each image sensor, indications of stuck or noisy pixels detected from raw image data acquired from the image sensors, and further comprising including in each bad-pixel maps indications of pixels that fail dynamic range testing in which pixels in the rectified and distortion-corrected image data obtained for a given image sensor are checked against a saturation threshold and an under-saturation threshold.

21. The method of claim 19, wherein the bad-pixel maps comprise, for each image sensor, indications of stuck or noisy pixels detected from raw image data acquired from the image sensors, and further comprising including in each bad-pixel maps indications of pixels that fail a contrast check performed by the image-processing circuits.

22. The method of claim 19, further comprising stereoscopically processing the rectified and distortion-corrected image data from the image sensors comprising each primary-baseline pair, generating corresponding depth maps comprising 3D range data corresponding to the pixels comprising such image data, using the depth maps to detect clusters of pixels that are within one or more defined range boundaries, comparing any detected clusters against a defined minimum object size, and tracking any detected cluster that meets the minimum object size to determine if it persists over one or more temporal filtering periods and, if so, indicating an object intrusion event to a control unit that is further included in the projective volume monitoring apparatus.

23. The method of claim 15, further comprising periodically injecting a test image into a stereo vision processor used for said redundant detection of objects in the primary monitoring zone, as a mechanism for verifying proper operation of the stereo vision processor.

24. The method of claim 15, further comprising mitigating object shadowing risks arising from zones of side shadowing on either side of the primary monitoring area based on at least one of:
 configuring a sensor unit containing the four image sensors, so that verging angles of the four image sensors minimize the zones of side shadowing; or
 configuring the sensor unit to perform stereo correlation processing for the image data acquired by each of the secondary-baseline pairs, for object detection within the zones of side shadowing.

25. The method of claim 15, wherein the four image sensors are arranged as two left-side image sensors spaced at said first secondary baseline to form said first secondary-baseline pair, and two-right side-image sensors spaced at said second secondary baseline to form said second secondary-baseline pair, and wherein the four image sensors are further arranged such that one left-side image sensor is paired with one right-side image sensor to form said first primary baseline pair spaced at said first primary baseline, while the other left-side image sensor is paired with the other right-side image sensor to form said second primary baseline pair spaced at said second primary baseline.

* * * * *